(12) United States Patent
Glasbrenner

(10) Patent No.: US 12,214,485 B2
(45) Date of Patent: Feb. 4, 2025

(54) ROBOT FOR BIO-SURVEILLANCE AND BIO-SURVEILLANCE SYSTEM

(71) Applicant: Battelle Memorial Institute, Columbus, OH (US)

(72) Inventor: David Carl Glasbrenner, Hilliard, OH (US)

(73) Assignee: Battelle Memorial Institute, Columbus, OH (US)

( * ) Notice: Subject to any disclaimer, the term of this patent is extended or adjusted under 35 U.S.C. 154(b) by 328 days.

(21) Appl. No.: 17/585,866

(22) Filed: Jan. 27, 2022

(65) Prior Publication Data

US 2022/0241984 A1 Aug. 4, 2022

Related U.S. Application Data

(60) Provisional application No. 63/143,709, filed on Jan. 29, 2021.

(51) Int. Cl.
| | |
|---|---|
| *B25J 11/00* | (2006.01) |
| *B25J 5/00* | (2006.01) |
| *B25J 9/00* | (2006.01) |
| *G01N 35/00* | (2006.01) |
| *G05D 1/00* | (2006.01) |

(52) U.S. Cl.
CPC ............. *B25J 11/008* (2013.01); *B25J 5/007* (2013.01); *B25J 9/0009* (2013.01); *G01N 35/0099* (2013.01); *G05D 1/0225* (2013.01); *G01N 2035/00524* (2013.01)

(58) Field of Classification Search
CPC ........ B25J 11/008; B25J 5/007; B25J 9/0009; G01N 35/0099; G01N 2036/00524; G05D 1/0225
See application file for complete search history.

(56) References Cited

U.S. PATENT DOCUMENTS

| | | | |
|---|---|---|---|
| 7,745,204 B1 | 6/2010 | Aidun | |
| 10,399,045 B2 | 9/2019 | Altomare | |
| 11,112,418 B1 * | 9/2021 | Holmes | G01N 15/1434 |

(Continued)

FOREIGN PATENT DOCUMENTS

| | | |
|---|---|---|
| EP | 1360934 A1 | 11/2003 |
| JP | 2006071455 | 3/2006 |

(Continued)

OTHER PUBLICATIONS

International Search Report and Written Opinion from corresponding PCT Appln. No. PCT/US22/14015 dated May 2, 2022, 7 pages.

(Continued)

*Primary Examiner* — Jaime Figueroa
*Assistant Examiner* — Zachary Joseph Wallace
(74) *Attorney, Agent, or Firm* — Grossman, Tucker, Perreault & Pfleger, PLLC; Zachary A. Cody

(57) ABSTRACT

A mobile robot may include one or more driven wheels, one or more sensors, and a sample collector. The sample collector may include a collection medium holder, a plurality of collection mediums disposed within the collection medium holder, and a collection medium applicator configured to releasably couple to a respective collection medium disposed within the collection medium holder.

20 Claims, 16 Drawing Sheets

(56) References Cited

U.S. PATENT DOCUMENTS

| | | |
|---|---|---|
| 2010/0313686 A1 | 12/2010 | Page et al. |
| 2016/0069918 A1* | 3/2016 | Holmes .............. G01N 35/1002 901/41 |
| 2017/0219614 A1* | 8/2017 | Cook ................. G01N 35/0099 |
| 2018/0080855 A1 | 3/2018 | Taylor |
| 2019/0331701 A1 | 10/2019 | Polley et al. |
| 2019/0335651 A1 | 11/2019 | Altomare |
| 2020/0096527 A1* | 3/2020 | Holmes .............. G01N 35/0099 |
| 2020/0163505 A1 | 5/2020 | Nakayama et al. |
| 2020/0170468 A1 | 6/2020 | Nakayama et al. |
| 2020/0196812 A1 | 6/2020 | Takayanagi |
| 2020/0290037 A1* | 9/2020 | Salomon .......... G01N 33/54366 |
| 2023/0278217 A1* | 9/2023 | Terry ................... A61B 90/361 700/260 |
| 2024/0142486 A1* | 5/2024 | Silbert .............. G01N 35/1016 |

FOREIGN PATENT DOCUMENTS

| | | |
|---|---|---|
| WO | 2019213023 A1 | 11/2019 |
| WO | 2020109508 A1 | 6/2020 |

OTHER PUBLICATIONS

Extended European Search Report of Corresponding Application No. EP22746572.1, Dated Nov. 11, 2024, 10 pages.
Certificate of Correction of U.S. Pat. No. 7745204B1, 1 page.

\* cited by examiner

ROBOT FOR BIO-SURVEILLANCE AND BIO-SURVEILLANCE SYSTEM

CROSS-REFERENCE TO RELATED APPLICATIONS

The present application claims the benefit of U.S. Provisional Application Ser. No. 63/143,709 filed on Jan. 29, 2021, entitled Robot for Bio-Surveillance and Bio-Surveillance System, which is fully incorporated herein by reference.

TECHNICAL FIELD

The present disclosure is generally directed to robots and more particularly to robots for use in bio-surveillance.

BACKGROUND

Presence of one or more pathogens (e.g., one or more of a virus, bacteria, fungus, archaea, and/or any other zoonotic organism) within an environment can be indicative of an infected individual being or having been present within the environment. Detection of the pathogen(s) within the environment may allow for novel and/or known pathogens to be identified prior to detection of an outbreak. Detection of a pathogen prior to an outbreak may mitigate the social and economic costs associated with the spread of the pathogen through a community. As such, monitoring an environment for one or more pathogens (or bio-surveillance) may mitigate an impact of a pathogen on a community and potentially prevent an outbreak.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIG. 15A shows a perspective view of a pivoting arm of the mobile robot of FIG. 11, consistent with embodiments of the present disclosure.

DETAILED DESCRIPTION

Figure 1:
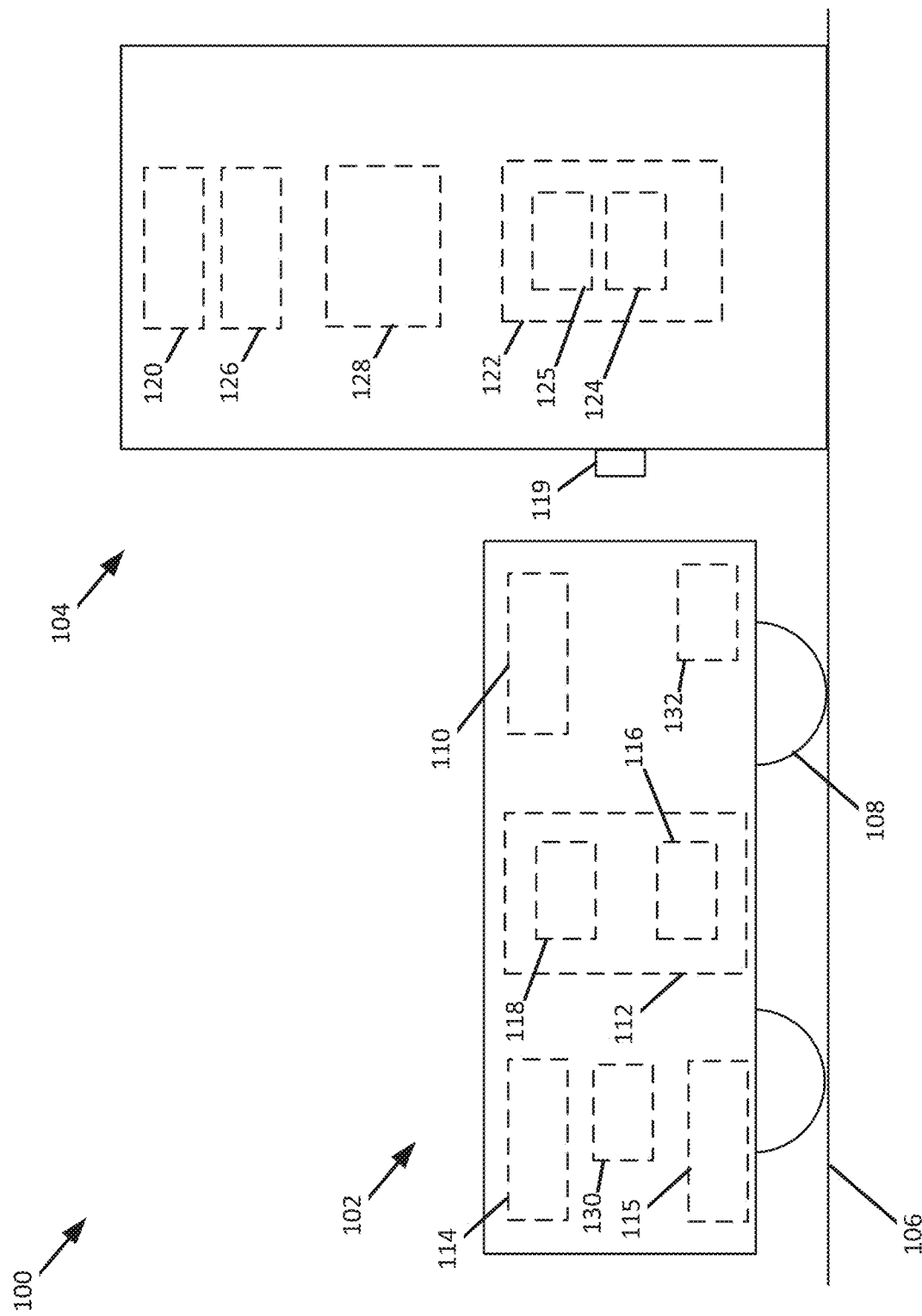
FIG. 1 shows a schematic example of a bio-surveillance system, consistent with embodiments of the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

The present disclosure is generally directed to a robot, a docking station, and a system for use in bio-surveillance. One example of a bio-surveillance system includes a mobile robot and a docking station. The mobile robot is configured to traverse a surface (e.g., an indoor surface such as a floor or counter top and/or an outdoor surface such as a sidewalk) while collecting one or more samples from the surface. The samples may include one or more pathogens (e.g., one or more of a virus, bacteria, fungus, archaea, and/or any other zoonotic organism). Pathogens deposited on a surface, such as a floor, (e.g., as a result of people breathing, speaking, coughing, etc.) may leave DNA or RNA traces that can be detected for several days. The one or more samples may be collected using one or more collection mediums (e.g., one or more swabs, gauze, one or more sponge sticks, pads, and/or any other collection medium) stored within a cartridge disposed within the mobile robot. After collecting the one or more samples, the mobile robot returns to the docking station and deposits the one or more samples in the docking station. The docking station may be configured to analyze the one or more samples for one or more pathogens. Additionally, or alternatively, the mobile robot may be configured to analyze one or more of the collected samples. In this instance, the collected samples may be deposited in the docking station for later disposal and/or for additional analysis (e.g., to confirm the analysis determined on the mobile robot).

The bio-surveillance system disclosed herein may enable early identification of known and/or novel pathogens in advance of an outbreak. In the case of known seasonal pathogens, identification of the specific strains and the prevalence of those strains may assist in development of vaccines for that season.

FIG. 1 shows a schematic example of a bio-surveillance system 100. As shown, the bio-surveillance system 100 includes a mobile robot 102 and a docking station 104. The mobile robot 102 is configured to travel along a surface 106 (e.g., a floor) of an environment while collecting environmental samples from the surface 106 that potentially contain one or more pathogens. After collecting environmental samples, the mobile robot 102 returns to the docking station 104 and deposits the collected samples in the docking station 104 for a pathogen analysis. In other words, the docking station 104 may be configured to receive one or more collected environmental samples from the mobile robot 102. The pathogen analysis is configured to detect a presence of one or more pathogens within the sample and attempt to identify any detected pathogen. The analysis may be performed by one or more systems of the docking station 104 and/or performed remotely from the docking station 104. In some instances, the analysis may be performed by one or more systems of the mobile robot 102 and the mobile robot 102 may deposit the analyzed samples in the docking station 104 for later disposal and/or for additional analysis (e.g., to confirm the analysis determined on the mobile robot 102).

As shown, the mobile robot 102 includes one or more driven wheels 108 configured to urge the mobile robot 102 over the surface 106, one or more sensors 110 configured to detect one or more conditions of the environment, a sample collection system 112 configured to collect environmental samples, and a controller 114 communicatively coupled to the driven wheels 108, the one or more sensors 110, and the sample collection system 112. The one or more sensors 110 may include obstacle detection sensors (e.g., ultrasonic, infrared, time of flight, stereo camera, monocular camera, and/or any other sensor) configured to detect non-traversable portions of the environment (e.g., walls, furniture, drop-offs, and/or any other obstacle). In some instances, the one or more sensors 110 may include a surface type detection sensor configured to detect a surface type (e.g., vinyl, steel, plastic, concrete, carpet, and/or any other surface type). Behaviors of the mobile robot 102 may be altered and/or selected based, at least in part, on outputs generated by the one or more sensors 110. For example, a sample collection behavior may be based, at least in part, on a detected surface type. In some instances, the one or more sensors 110 may include one or more localization and/or mapping sensors configured to generate data capable of being used in map generation (e.g., one or more localization and/or mapping sensors may include one or more of an obstacle detection sensor, a surface type sensor, a triangulation sensor, and/or any other sensor). A generated map may include indications of obstacles and detected surface types. In some instances, the mobile robot 102 may further include a robot transmitter 115 configured to communicate with the docking station 104 and/or a remote device (e.g., a remote computer, mobile device, and/or any other remote device).

The sample collection system 112 may include a sample collector 116 and a sample storage 118. The sample collector 116 is configured to cause an environmental sample to be collected from the surface 106. Once collected, the sample collector 116 may deposit the collected sample in the sample storage 118 for storage. The sample storage 118 is configured to preserve the integrity of the collected sample until the collected sample can be analyzed (e.g., until the collected sample can be deposited and analyzed in the docking station 104).

In some instances, there may be a plurality of mobile robots 102 disposed within an environment. The plurality of mobile robots 102 may be configured to cooperate to collect samples. For example, the plurality of mobile robots 102 may be configured to communicate with each other such that different regions within the environment are covered by each of the mobile robots 102. The plurality of mobile robots 102 may share at least one common docking station 104 and/or may each have at least one dedicated docking station 104 that corresponds to a respective one of the plurality of mobile robots 102.

The docking station 104 includes one or more charging contacts 119, at least one identifier 120, and a sample receiver 122. The one or more charging contacts 119 are configured to charge one or more batteries of the mobile robot 102 when the mobile robot 102 is engaging (or docked with) the docking station 104. The at least one identifier 120 is configured to identify the docking station 104 to the mobile robot 102. For example, the at least one identifier 120 may include one or more light emitting diodes (LEDs) configured to emit a signal into the environment, wherein the mobile robot 102 is configured to use the signal(s) to locate and dock with the docking station 104.

The sample receiver 122 may be configured to cooperate with the sample collector 116 when the mobile robot 102 is docked with the docking station 104. For example, the sample collector 116 and the sample receiver 122 may cooperate to transfer collected samples from the sample collector 116 to the sample receiver 122. The sample receiver 122 may, in some instances, include an analysis system 124. The analysis system 124 may be configured to analyze the sample(s) received by the sample receiver 122. The results of the analysis may be transmitted to a remote device (e.g., a remote computer, mobile device, or another remote device) for review by a user using, for example, a dock transmitter 126 within the docking station 104. Additionally, or alternatively, the analysis system 124 may be included in the mobile robot 102. In some instances, sample receiver 122 may include a processing system 125 configured to process the received sample(s) (e.g., extract nucleic acid from the received sample(s)) such that the processed sample can be analyzed by an external analysis system (e.g., at an external lab or analysis facility). Additionally, or alternatively, the processing system 125 may be included in the mobile robot 102.

In some instances, the docking station 104 may further include a supply replenisher 128. The supply replenisher 128 is configured to replenish/replace physical resources that are expended by the mobile robot 102 while collecting environmental samples (e.g., one or more of the components used for sample collection).

Figure 2:
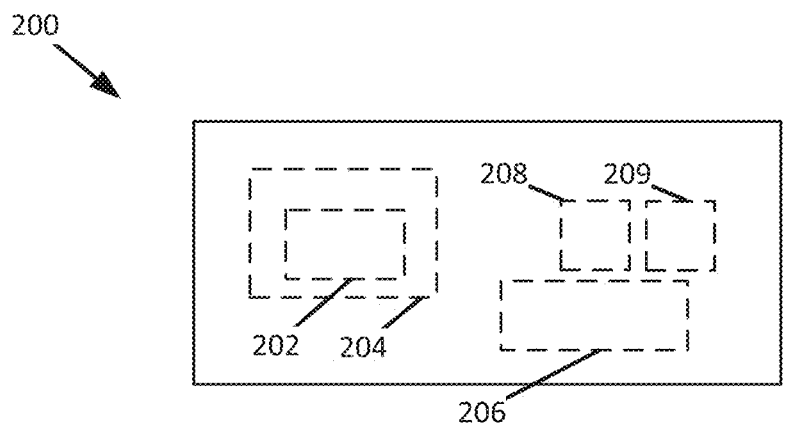
FIG. 2 shows a schematic example of a sample collector, consistent with embodiments of the present disclosure.

FIG. 2 shows a schematic example of a sample collector 200, which may be an example of the sample collector 116 of FIG. 1. As shown, the sample collector 200 includes a collection medium holder 204 having a plurality collection mediums 202 and a collection medium applicator 206. The collection medium applicator 206 is configured to releasably couple to a respective collection medium 202 disposed within the collection medium holder 204. Examples of the collection mediums 202 may include one or more of a swab, a pad (e.g., that is configured to be in sliding contact with the surface 106 while the mobile robot 102 traverses the surface 106), a sponge stick, gauze, and/or any other collection medium.

Once the respective collection medium 202 is coupled to the collection medium applicator 206, the collection medium applicator 206 urges the collection medium 202 into contact with a surface (e.g., the surface 106). One or more contact sensors 208 (e.g., of the collection medium applicator 206) may be configured to detect when the respective collection medium 202 contacts the surface 106. Additionally, or alternatively, one or more distance sensors 209 may be configured to detect a proximity of the surface 106 and based, at least in part, on the detected proximity of the surface 106 determine a proximity of the respective collection medium 202 relative to the surface 106. The collection medium applicator 206 may be configured to cause the collection medium 202 to maintain contact with the surface 106 for a predetermined time (e.g., while the mobile robot 102 moves across the surface 106). The predetermined time may be based, at least in part, on an estimated minimum contact duration to collect a sample having a sufficient quantity of pathogen for analysis. In some instances, the collection medium applicator 206 may be configured to agitate the collection medium 202 along the surface 106. For example, the collection medium applicator 206 may be configured to urge the collection medium 202 along the surface 106 according to a pattern (e.g., a zig-zag pattern, an S pattern, a circular pattern, a U pattern, and/or any other pattern). Additionally, or alternatively, the collection medium applicator 206 may be configured to rotate the collection medium 202 about a longitudinal axis of the collection medium 202. Such a configuration may allow all sides of the collection medium 202 to face the surface 106 such that at least a portion of each side of the collection medium 202 contacts the surface 106.

After contacting the surface 106 (e.g., for the predetermined time), the collection medium applicator 206 may be configured to urge the collection medium 202 out of engagement with the surface 106. Once the collection medium 202 is out of engagement with the surface 106, the collection medium applicator 206 may position the collection medium 202 such that it can be received within a sample storage (e.g., the sample storage 118). When received within the sample storage 118, the collection medium applicator 206 is configured to decouple from the collection medium 202, depositing the collection medium 202 in the sample storage 118. After depositing the collection medium 202 in the sample storage 118, the collection medium applicator 206 may releasably couple to another collection medium 202 disposed within the collection medium holder 204.

Figure 3:
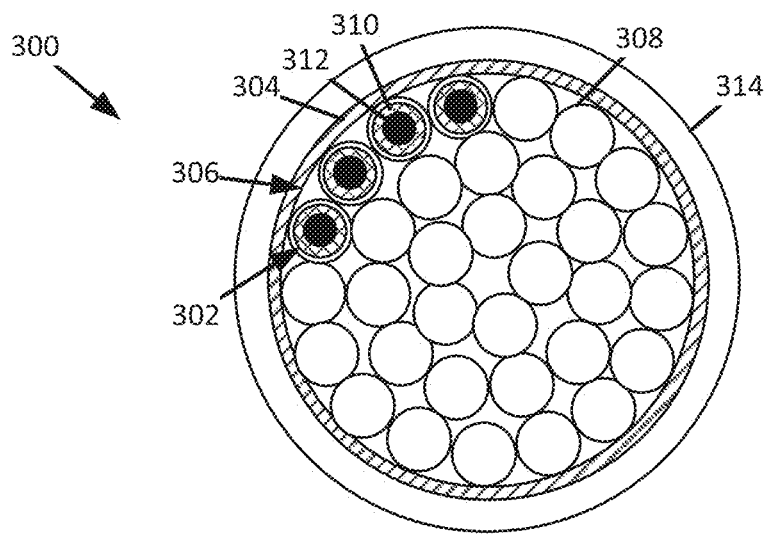
FIG. 3 shows a schematic example of a cartridge, consistent with embodiments of the present disclosure.

FIG. 3 shows a schematic example of a cartridge 300 configured to hold a plurality of swabs 302, wherein the cartridge 300 may be an example of the collection medium holder 204 and the plurality of swabs 302 may be an example of the plurality of collection mediums 202. The cartridge 300 includes a cartridge body 304 defining a cartridge cavity 306 having a plurality of swab receptacles 308 extending within the cartridge cavity 306. The swab receptacles 308 are configured to receive a corresponding one of the swabs 302. In some instances, open ends of the swab receptacles 308 may be enclosed (e.g., with a pierceable membrane or stopper) such that a sterility of the swabs 302 may be maintained. Each swab 302 includes a collection end 310 and a coupling end 312. The collection end 310 includes a material capable of collecting one or more pathogens thereon when engaged with the surface 106 and the coupling end 312 is configured to releasably couple to a collection medium applicator (e.g., the collection medium applicator 206). In some instances, the collection end 310 corresponding to a first swab 302 may include a first material and the collection end 310 corresponding to a second swab 302 may include a second material, the second material being different from the first material such that the collection ends 310 of the first and second swabs 302 have a different composition. Having the collection end 310 of at least one swab 302 have a composition different from that of the collection end 310 of at least one other swab 302 may allow the cartridge 300 to include swabs 302 tailored for specific sample collections and/or environments.

The cartridge 300 may be configured to rotate. Rotation of the cartridge 300 may rotationally position one or more of the swabs 302 at location accessible to the collection medium applicator 206. For example, the cartridge 300 may include a cartridge drive 314 configured to engage with a motor such that, when the motor is actuated, the cartridge 300 may be caused to rotate. In this example, the mobile robot 102 may include a cartridge drive motor configured to engage the cartridge drive 314.

Figure 4:
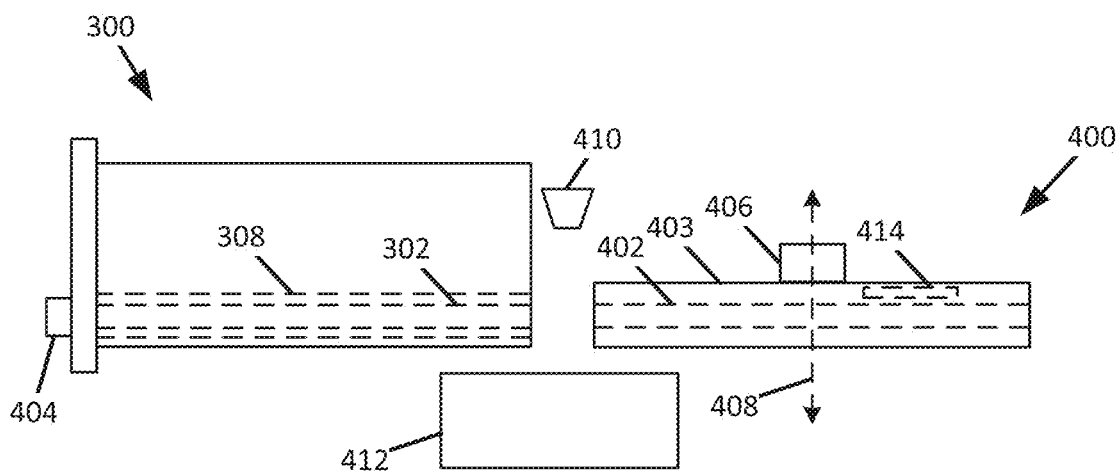
FIG. 4 shows a schematic example of a collection medium applicator cooperating with the cartridge of FIG. 3, consistent with embodiments of the present disclosure.

FIG. 4 shows a schematic example of a collection medium applicator 400, which may be an example of the collection medium applicator 206 of FIG. 2, cooperating with the cartridge 300 of FIG. 3 to releasably couple to a respective one of the swabs 302. As shown, the collection medium applicator 400 may include a swab coupler 402 configured to be releasably coupled to a respective swab 302. For example, the swab coupler 402 may be configured to apply a clamping force to the swab 302 (e.g., a chuck-style clamp or any other type of clamp) when the swab 302 is received within the swab coupler 402.

In some instances, the swab coupler 402 may be extendible from a main body 403 of the collection medium applicator 400 such that the swab coupler 402 can extend at least partially within the swab receptacle 308 corresponding to a respective swab 302 and releasably couple to the swab 302. Additionally, or alternatively, the cartridge 300 may cooperate with and/or include a swab pusher 404 configured to urge a respective swab 302 from a corresponding swab receptacle 308 and into the swab coupler 402. The swab pusher 404 may, for example, be a mechanical actuator (e.g., including a piston and/or spring) that comes into engagement with a respective swab 302 and urges the swab 302 to slide out of a corresponding swab receptacle 308 and into the swab coupler 402 such that the swab coupler 402 is capable of releasably coupling to the swab 302. Additionally, or alternatively, the swab pusher 404 may use pressurized gas (e.g., air) to urge a respective swab 302 to slide out of a corresponding swab receptacle 308.

Once the swab coupler 402 releasably couples to a respective swab 302, the collection medium applicator 400 may urge the swab 302 into engagement with the surface 106. For example, in response to the swab 302 being releasably coupled to the swab coupler 402, a swab actuator 406 may cause the collection medium applicator 400 to rotate about a swab actuation axis 408, wherein rotation of the collection medium applicator 400 brings the swab 302 into contact with the surface 106. In some instances, the swab actuation axis 408 may extend transverse to the surface 106 at a non-perpendicular angle. Such a configuration may cause a rotation plane of the swab 302 to intersect the surface 106 such that the swab 302 comes into engagement with the surface 106. By way of further example, the swab actuator 406 may urge the collection medium applicator 400 along the swab actuation axis 408 in a direction of the surface 106 until the swab 302 comes into engagement with the surface 106. The swab actuator 406 may include any one or more of pneumatics, hydraulics, motors, and/or any other mechanism capable of moving the collection medium applicator 400.

In some instances, prior to engaging the surface 106, a transport medium (e.g., a viral transport medium, a fungal transport medium, a bacterial transport medium, a phosphate-buffered saline (PBS) buffer, and/or the like) may be applied to at least a portion of the swab 302 (e.g., applied to at least portion of the collection end 310). For example, one or more spray nozzles 410 fluidly coupled to one or more transport medium storage tanks 412 may apply the transport medium onto at least a portion of the collection end 310 of the swab 302. In some instances, each spray nozzle 410 may correspond to a respective transport medium. The spray nozzle 410 and the transport medium storage tanks 412 may be, for example, included in the sample collector 200. By way of further example, at least a portion of the collection end 310 of the swab 302 may be inserted into the transport medium storage tank 412 prior to engaging the surface 106. In this example, the swab actuator 406 may be configured to lower at least a portion of the collection end 310 of the swab 302 into the transport medium. In examples having a plurality of transport medium storage tanks 412, each having a corresponding transport medium, the swab actuator 406 may be configured to lower at least a portion of the collection end 310 of the swab 302 into the desired transport medium. By way of still further example, each of the swab receptacles 308 of the cartridge 300 may include a transport medium. In this example, at least one swab receptacle 308 may include a transport medium that is different from a transport medium in at least one other swab receptacle 308. In this instance, the collection medium applicator 400 may be configured to determine the transport medium within a respective swab receptacle 308 before the swab 302 is removed therefrom. By way of still further example, a desired transport medium may be applied to at least a portion of the collection end 310 of a respective swab 302 prior to the swab 302 being deposited in a corresponding swab receptacle 308 of the cartridge 300. In this example, the desired transport medium may be applied to at least a portion of the collection end 310 by a docking station (e.g., the docking station 104 of FIG. 1) prior to, for example, the cartridge 300 being deposited in the mobile robot 102. In some instances, one or more of the swabs 302 may not have a transport medium applied thereto.

In some instances, the transport medium applied may be selected based, at least in part, on the pathogens sought to be collected. For example, viral transport media may be used for collection of viral pathogens, lysogeny broth (LB) may be used for collection of bacteria, and Sabourand dextrose or malt extract media for fungi. As such, in some instances, the sample collector 200 may include a plurality of transport medium storage tanks 412, each corresponding to a respective transport medium.

When transport medium is applied to the swab 302, at least a portion of the transport medium may be deposited on the surface 106 (e.g., a result of the engagement between the swab 302 and the surface 106). As such, in some instances, the mobile robot 102 may include a drying and/or cleaning element 130 (e.g., a cloth or an air blast) (see, FIG. 1) positioned behind the swab 302 (relative to a forward direction of movement of the mobile robot 102). The drying and/or cleaning element 130 may dry/collect at least a portion of any residual transport medium on the surface 106 as a result of the swab 302 engaging the surface 106. Additionally, or alternatively, the mobile robot 102 may include a decontamination system 132 (see, FIG. 1) configured to decontaminate the surface 106. For example, the decontamination system 132 may be configured to apply a decontamination substance (e.g., isopropanol, quaternary ammonium compounds, and/or any other decontamination substance) to the surface 106. By way of further example, the decontamination system 132 may include an ultraviolet emission source configured to emit ultraviolet light having a wavelength that is harmful to one or more microorganisms.

As shown, in some instances, the collection medium applicator 400 may include a contact sensor 414, which may be an example of the contact sensor 208 of FIG. 2. The contact sensor 414 is configured to detect when the swab 302 comes into engagement with the surface 106. For example, when engaging the surface 106, the swab 302 may exert a force on the swab coupler 402 and the contact sensor 414 is configured to detect the exerted force. In some instances, when the contact sensor 414 detects the exerted force, rotation of the swab 302 (e.g., about the swab actuation axis 408) may stop for a predetermined period of time (e.g., maintaining the swab 302 in contact with the surface 106 while the mobile robot 102 traverses the surface 106). As such, movement of the mobile robot 102 across the surface 106 results in the swab 302 sliding over the surface 106, collecting a sample at the collection end 310 of the swab 302. In some instances, the swab 302 may be agitated (e.g., rotated multiple times in two different directions about swab actuation axis 408) while engaging the surface 106 such that, for example, a contact force exerted by the swab 302 on the surface 106 is varied. Additionally, or alternatively, the agitation of the swab 302 may be based, at least in part, on a detected surface type corresponding to the surface 106. For example, the swab 302 may be moved along the surface 106 according to swabbing methodologies known to those having ordinary skill in the art that correspond to a detected surface type. When the swab 302 is agitated along the surface 106, the mobile robot 102 may not be moving along the surface 106 (e.g., the mobile robot 102 may stop at a position on the surface 106 for a predetermined period of time).

Figure 5:
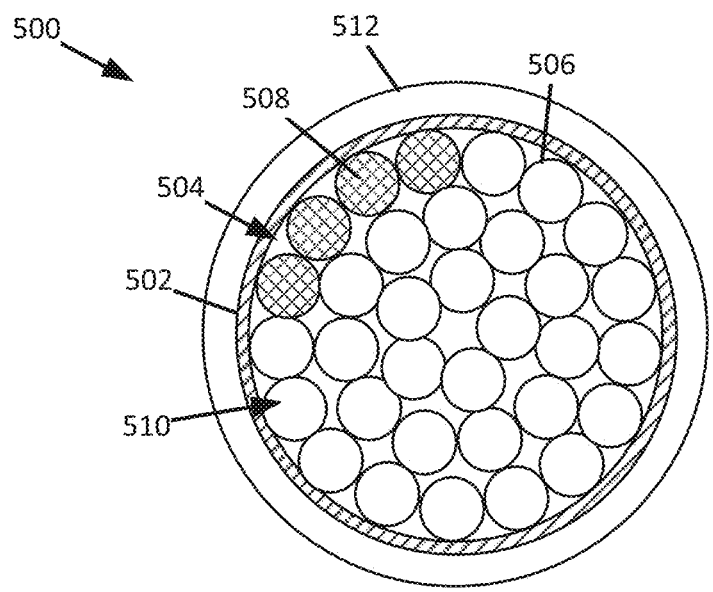
FIG. 5 shows a schematic example of a sample storage, consistent with embodiments of the present disclosure.

FIG. 5 shows a schematic example of a sample storage 500, which may be an example of the sample storage 118 of FIG. 1. As shown, the sample storage 500 includes a storage body 502 defining a storage cavity 504 configured to receive the swabs 302 after the swabs 302 have engaged the surface 106, wherein one or more of the swabs 302 may include a sample of a pathogen. When received within the storage cavity 504, each swab 302 may be deposited within a respective sample receptacle 506. Each sample receptacle 506 may be configured to receive a single swab 302 such that a plurality of swabs 302 can be received within the storage cavity 504 without cross-contamination occurring between swabs 302. Each sample receptacle 506 may be removably coupled to a portion of the storage body 502 such that each sample receptacle 506 may be removed from the storage cavity 504 (e.g., when the mobile robot 102 docks with the docking station 104).

In some instances, each sample receptacle 506 may include a unique identifier 600 (e.g., a bar code or radio frequency identification tag), wherein the unique identifier 600 is associated with a location within the environment, the location corresponding to a location where the swab 302 engaged the surface 106. In other words, the unique identifier 600 can be used to identify a location within the environment at which a sample was taken. For example, the mobile robot 102 may include a localization and mapping system configured to identify the sample location within a map (e.g., a map generated by the mobile robot 102) and associate the sample location with the corresponding unique identifier 600.

As shown, each sample receptacle 506 can be configured to removably couple to a stopper 508, wherein the stopper 508 encloses an open end 510 of the sample receptacle 506. The open end 510 of each sample receptacle 506 is opposite a closed end and is configured to receive a corresponding swab 302. Each stopper 508 can sealingly engage with at least a portion of a respective sample receptacle 506. For example, the stopper 508 may form a press-fit with a respective sample receptacle 506 or threadably engage with a respective sample receptacle 506 (e.g., in some instances, the act of threading a respective stopper 508 onto a corresponding sample receptacle 506 may result in the compression of a seal). In some instances, each swab 302 may include a corresponding stopper 508 coupled thereto (e.g., at the coupling end 312 of a respective swab 302). As such, the act of inserting a respective swab 302 in a corresponding sample receptacle 506 may cause the stopper 508 to sealingly engage with the sample receptacle 506. In these instances, when the swabs 302 are within corresponding swab receptacles 308 of the cartridge 300, the stopper 508 may also be configured to sealingly engage with the corresponding swab receptacle 308 and the stopper 508 may be further configured to releasably couple to the swab coupler 402. Such a configuration may maintain the sterility of the swabs 302 while disposed within the cartridge 300. In these instances, the cartridge 300 may also act as the sample storage 500 (e.g., each swab 302 may be returned to a corresponding swab receptacle 308 after use).

The sample storage 500 may, in some instances, be configured to cooperate with the collection medium applicator 400 such that a respective swab 302 can be transferred from the swab coupler 402 to a corresponding sample receptacle 506. For example, the sample storage 500 may be configured to rotate such that a corresponding sample receptacle 506 aligns with a position of the collection medium applicator 400. In this example, the sample storage 500 may include a storage drive 512 configured to cooperate with a drive motor to cause the sample storage 500 to rotate.

Figure 6:
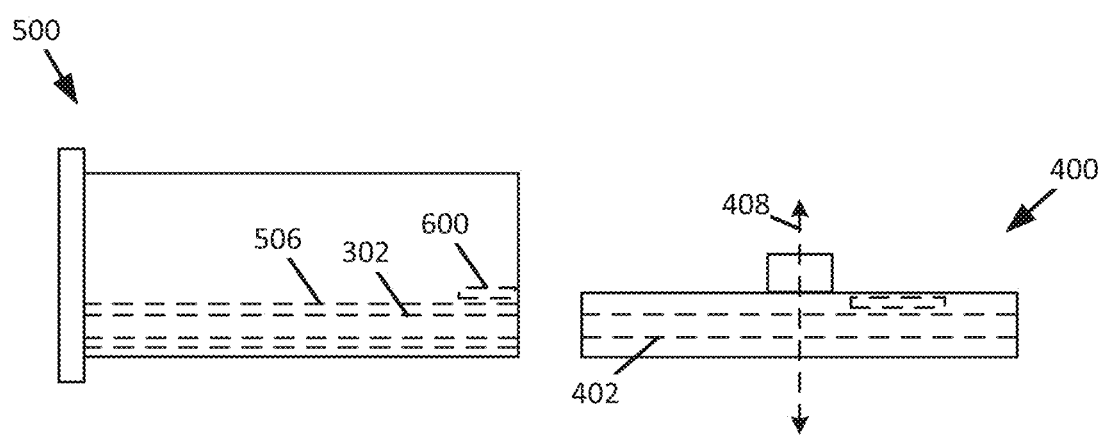
FIG. 6 shows a schematic example of the collection medium applicator of FIG. 4 cooperating with the sample storage of FIG. 5, consistent with embodiments of the present disclosure.

FIG. 6 shows a schematic example of the collection medium applicator 400 cooperating with the sample storage 500 to deposit a respective swab 302 in a corresponding sample receptacle 506. For example, the collection medium applicator 400 may be configured to move relative to the swab actuator axis 408 (e.g., linearly and/or rotationally) to position the swab coupler 402 in an orientation that aligns a respective swab 302 with a corresponding sample receptacle 506. In this example, the swab coupler 402 may be configured to extend from the collection medium applicator 400 and at least partially into the corresponding sample receptacle 506, wherein the swab coupler 402 decouples from the respective swab 302 in response to the swab 302 being received within the sample receptacle 506. In some instances, the collection medium applicator 400 may be configured to couple the stopper 508 to a corresponding sample receptacle 506.

Figure 7:
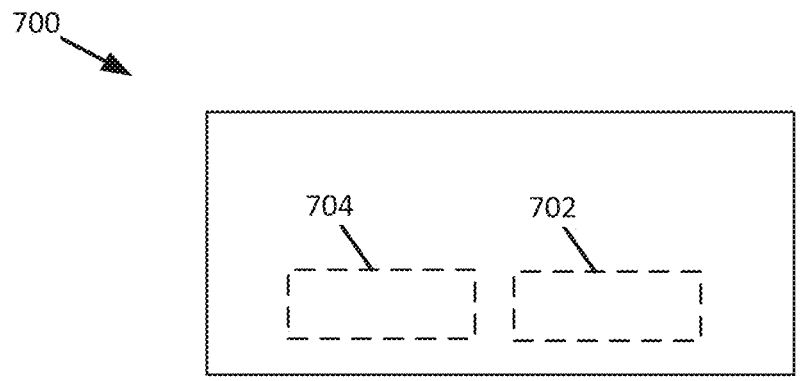
FIG. 7 shows a schematic example of a sample receiver, consistent with embodiments of the present disclosure.

FIG. 7 shows a schematic example of a sample receiver 700 for a docking station and may be an example of the sample receiver 122 of FIG. 1. As shown, the sample receiver 700 includes a transfer section 702 configured to cooperate with a mobile robot (e.g., the mobile robot 102) to transfer collected samples from the sample storage 118 of the mobile robot 102. In some instances, the sample receiver 700 may further include a sample handler 704. The sample handler 704 may cooperate with the transfer section 702 to prepare individual samples collected from the mobile robot 102 for analysis. For example, when the sample has been collected using the swab 302 and the swab 302 is enclosed within the sample receptacle 506, the sample handler 704 may be configured to remove the swab 302 from the sample receptacle 506. Once removed from the sample receptacle 506, the sample handler 704 may deposit the swab 302 in the analysis system 124 for analysis. The analysis system 124 may be configured to perform a quantitative polymerase chain reaction (qPCR) analysis and/or massive parallel sequencing (or next generation sequencing) in order to detect and/or identify any pathogens collected by the swab 302. The results of the analysis may be transmitted to a remote device using the dock transmitter 126. In some instances, the results may be associated with a location in the environment corresponding to a location where the sample was collected. The remote device may be configured to display the collection location on a map of the environment.

Figure 8:
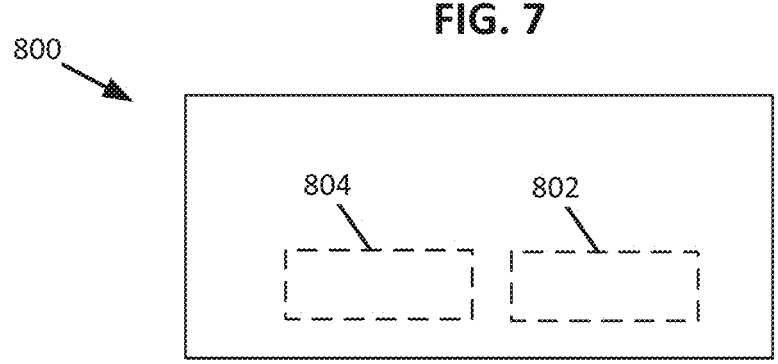
FIG. 8 shows a schematic example of a transfer section, consistent with embodiments of the present disclosure.

FIG. 8 shows a schematic example of a transfer section 800 of a sample receiver, which may be an example of the transfer section 702 of FIG. 7. As shown, the transfer section 800 includes a transfer actuator 802 and a transfer storage 804. The transfer actuator 802 may be configured to extend from the docking station (e.g., the docking station 104) and in a direction of the mobile robot (e.g., the mobile robot 102). In some instances, the transfer actuator 802 may extend into the mobile robot 102 and extract one or more collected samples. For example, the transfer actuator 802 may couple to and remove one or more sample receptacles 506 from the sample storage 500 of FIG. 5. The extracted samples may be deposited in the transfer storage 804. Additionally, or alternatively, the mobile robot 102 may include a transfer actuator configured to urge one or more collected samples out of the mobile robot 102 and into the docking station 104.

Figure 9:
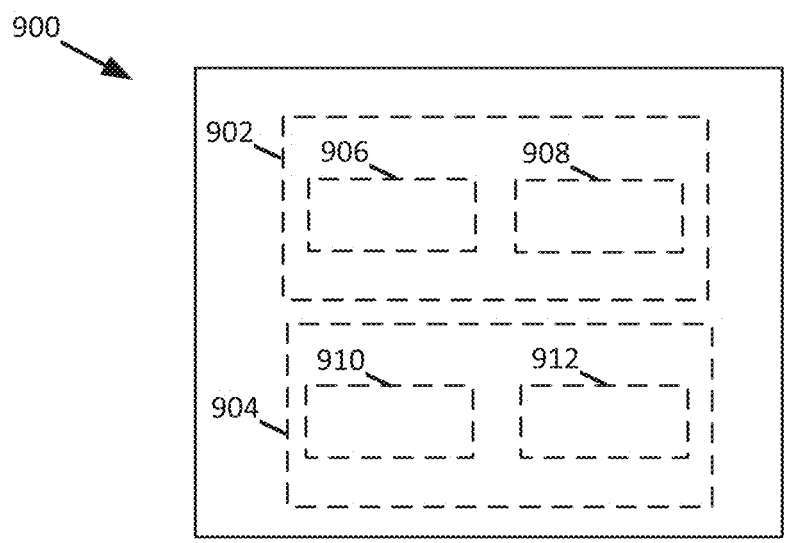
FIG. 9 shows a schematic example of a supply replenisher, consistent with embodiments of the present disclosure.

FIG. 9 shows a schematic example of a supply replenisher 900 for a docking station and may be an example of the supply replenisher 128 of FIG. 1. As shown, the supply replenisher 900 includes a supply source 902 and a supply distributor 904. The supply source 902 is configured to store one or more of the components used for sample collection. For example, the supply source 902 may include a liquid supply source 906 and a dry supply source 908. The liquid supply source 906 may include one or more tanks, each tank having a corresponding transport medium. The dry supply source 908 may include storage for one or more collection mediums 202 (e.g., one or more swabs 302). The supply distributor 904 may be configured to cooperate with the supply source 902 to transfer one or more components used for sample collection to the mobile robot 102. For example, the supply distributor 904 may include one or more fluid transfer couplings 910 configured to fluidly couple to the mobile robot 102 (e.g., one or more transport medium storage tanks 412) for transferring transport medium to the mobile robot 102. By way of further example, the supply distributor 904 may include one or more dry supply actuators 912 configured to transfer one or more swabs 302 (e.g., stored within a cartridge 300) to the mobile robot 102. In this example, the supply distributor 904 or the transfer section 800 may be configured to remove an expended cartridge 300 from the mobile robot 102 prior to transferring a replacement cartridge 300 having one or more swabs 302.

Figure 10:
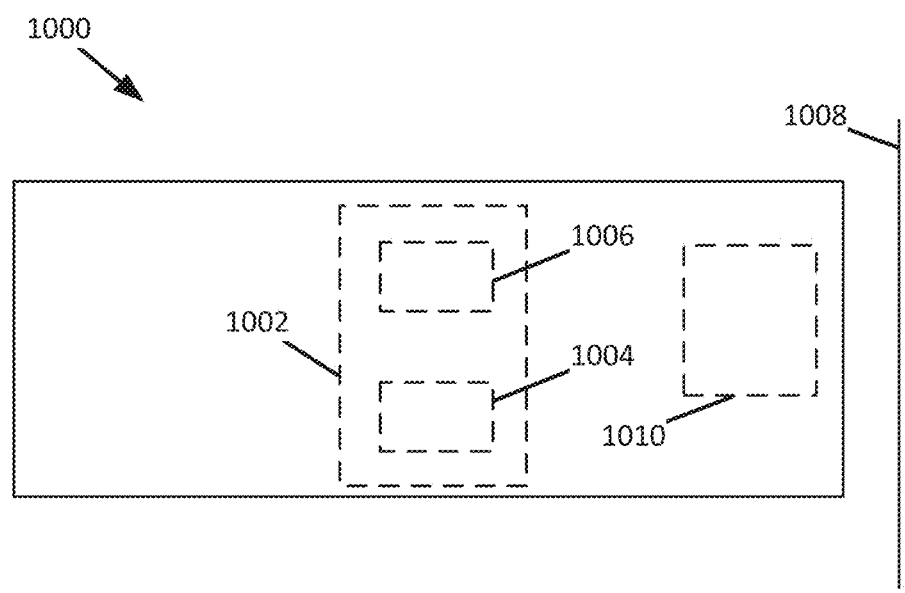
FIG. 10 shows a schematic example of a stationary robot, consistent with embodiments of the present disclosure.

FIG. 10 shows a schematic example of a stationary robot 1000. The stationary robot 1000 includes a sample collection system 1002. The sample collection system 1002 may include a sample collector 1004 and a sample storage 1006. The sample collector 1004 is configured to collect an environmental sample from a surface 1008 proximate the stationary robot 1000. Once collected, the sample collector 1004 may deposit the sample in the sample storage 1006. Once deposited in the sample storage 1006, the sample may be stored until it can be analyzed (e.g., locally or remotely). In some instances, the stationary robot 1000 may include an analysis system 1010 configured to analyze a collected sample for a presence of one or more pathogen(s).

An example of the analysis system 1010 may be the analysis system 124 of FIG. 1. An example of the sample collector 1004 may be the sample collector 116 of FIG. 1 and an example of the sample storage 1006 may be the sample storage 118 of FIG. 1. As such, the stationary robot 1000 may generally be described as being a stationary version of the mobile robot 102. Accordingly, one or more of the features discussed herein in relation to collecting environmental samples using the mobile robot 102 may also be included in the stationary robot 1000.

The surface 1008 may be a high touch surface. For example, the surface 1008 may be a hand belt for an escalator or moving walkway. By way of further example, the surface 1008 may be a belt of a treadmill.

Figure 11:
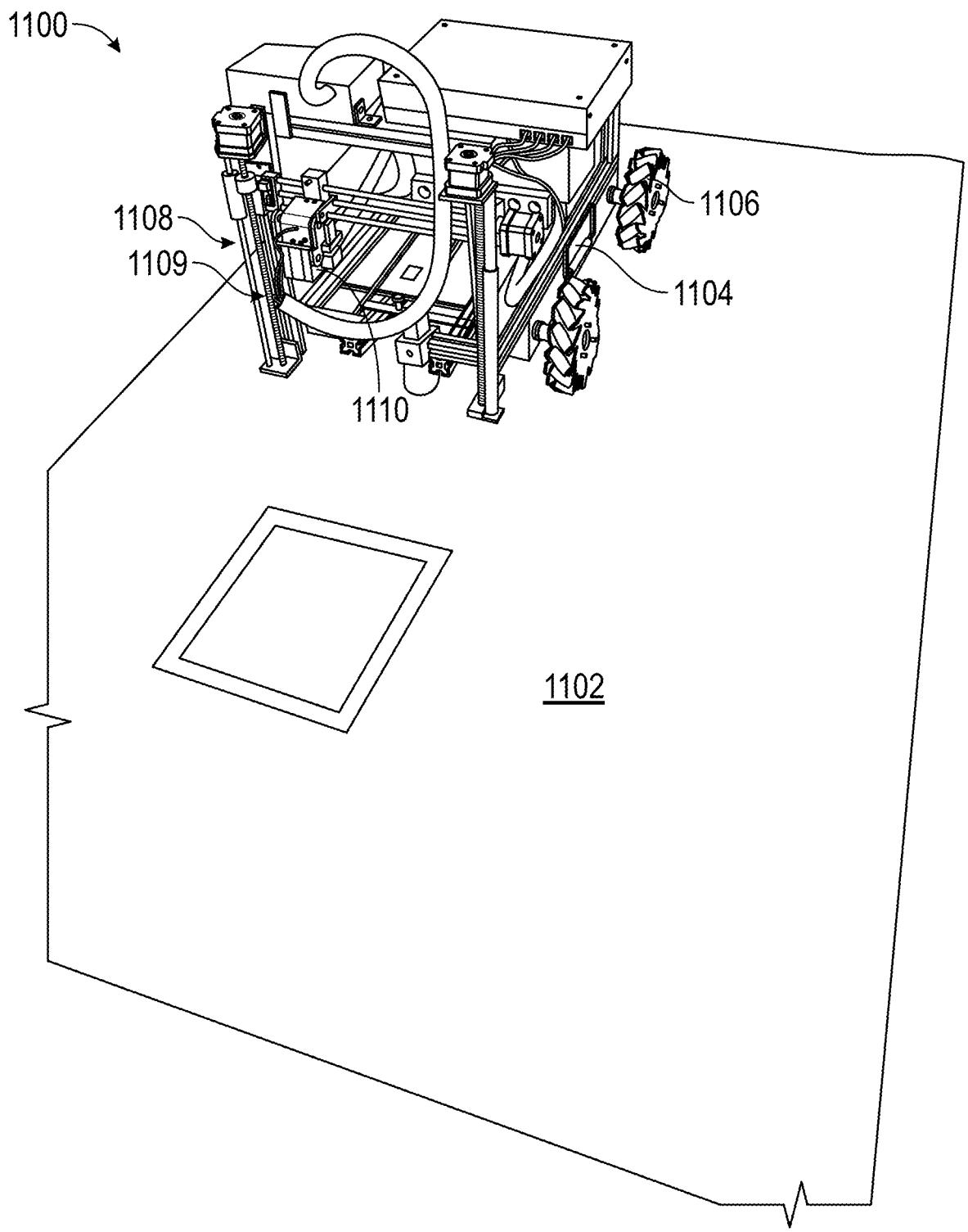
FIG. 11 shows a perspective view of an example of a mobile robot, consistent with embodiments of the present disclosure.
Figure 12:
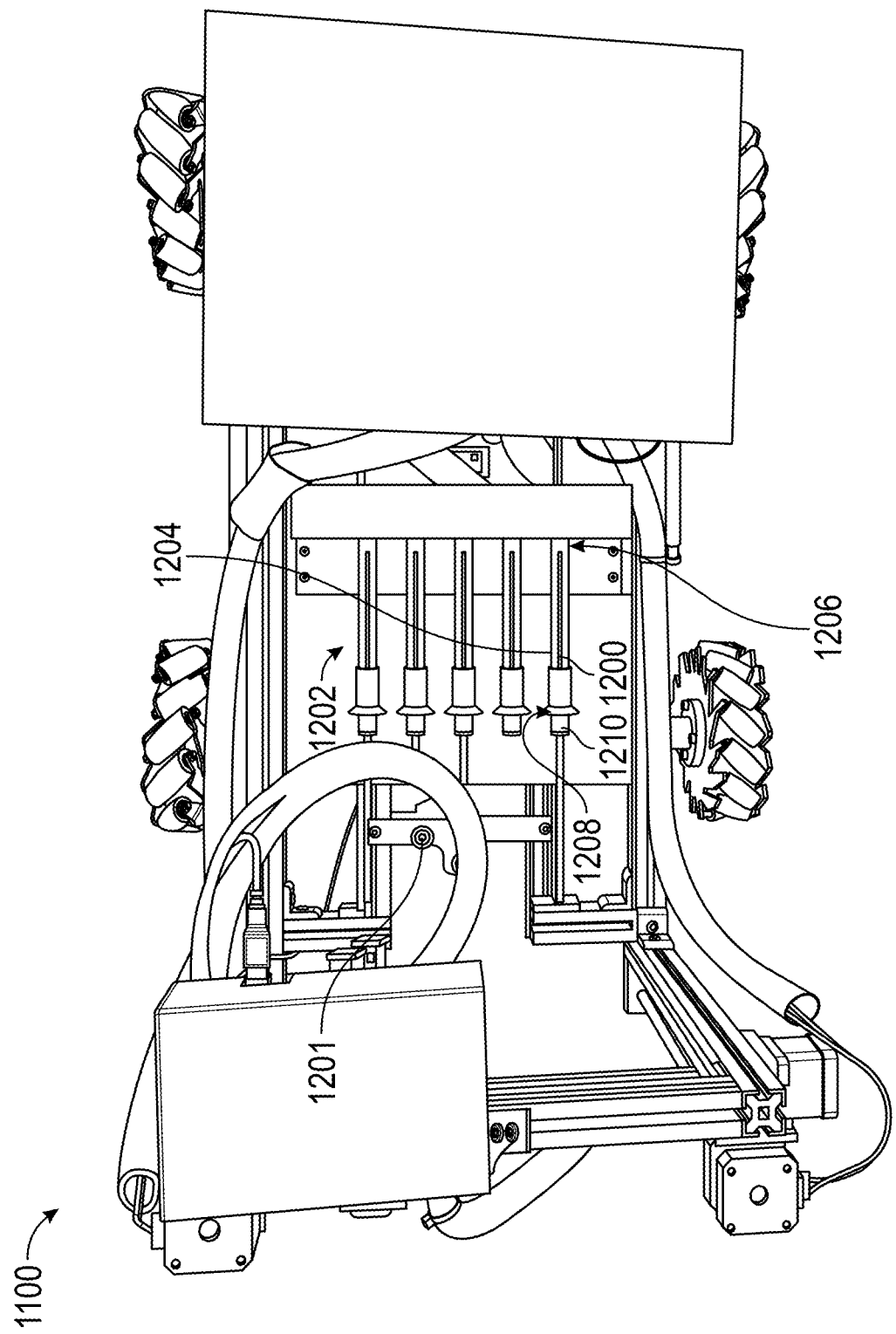
FIG. 12 shows a top view of the mobile robot of FIG. 11, consistent with embodiments of the present disclosure.

FIG. 11 shows a perspective view of a mobile robot 1100 configured to traverse a floor 1102 and FIG. 12 shows a top view of the mobile robot 1100. The mobile robot 1100 may be an example of the mobile robot 102 of FIG. 1. As shown, the mobile robot 1100 includes a chassis 1104 and a plurality of omnidirectional wheels 1106 rotationally coupled to the chassis 1104. The omnidirectional wheels 1106 are configured to enable the mobile robot 1100 to move in a forward direction, a backward direction, a left direction, a right direction, and/or a combination thereof (e.g., diagonally, rotationally, and/or any other combination). A sample collector 1108 is coupled to the chassis 1104 and is configured collect one or more samples from the floor 1102. The mobile robot 1100 may include one or more sensors 1201 (FIG. 12). For example, the one or more sensors 1201 may include odometry sensors (e.g., optical sensors to track movement of the mobile robot 1100 relative to the floor 1102), obstacle sensors, and/or any other type of sensor.

The sample collector 1108 includes a positioning system 1109 and a swab applicator 1110 configured to releasably couple to a swab 1200 (FIG. 12) that is stored within a swab holder 1202 (FIG. 12). As shown in FIG. 12, the swab holder 1202 includes a plurality of separate swab receptacles 1204, each configured to receive a respective swab 1200. The swab receptacles 1204 define a closed end 1206 and an open end 1208 opposite the closed end 1206. The open end 1208 is configured to receive a stopper 1210 that is coupled at a non-collection end of the swab 1200. The stopper 1210 may be configured to sealingly engage with a respective swab receptacle 1204. As shown, the open end 1208 may be flared to encourage insertion of the swab 1200 and/or stopper 1210 into the swab receptacle 1204.

Figure 13:
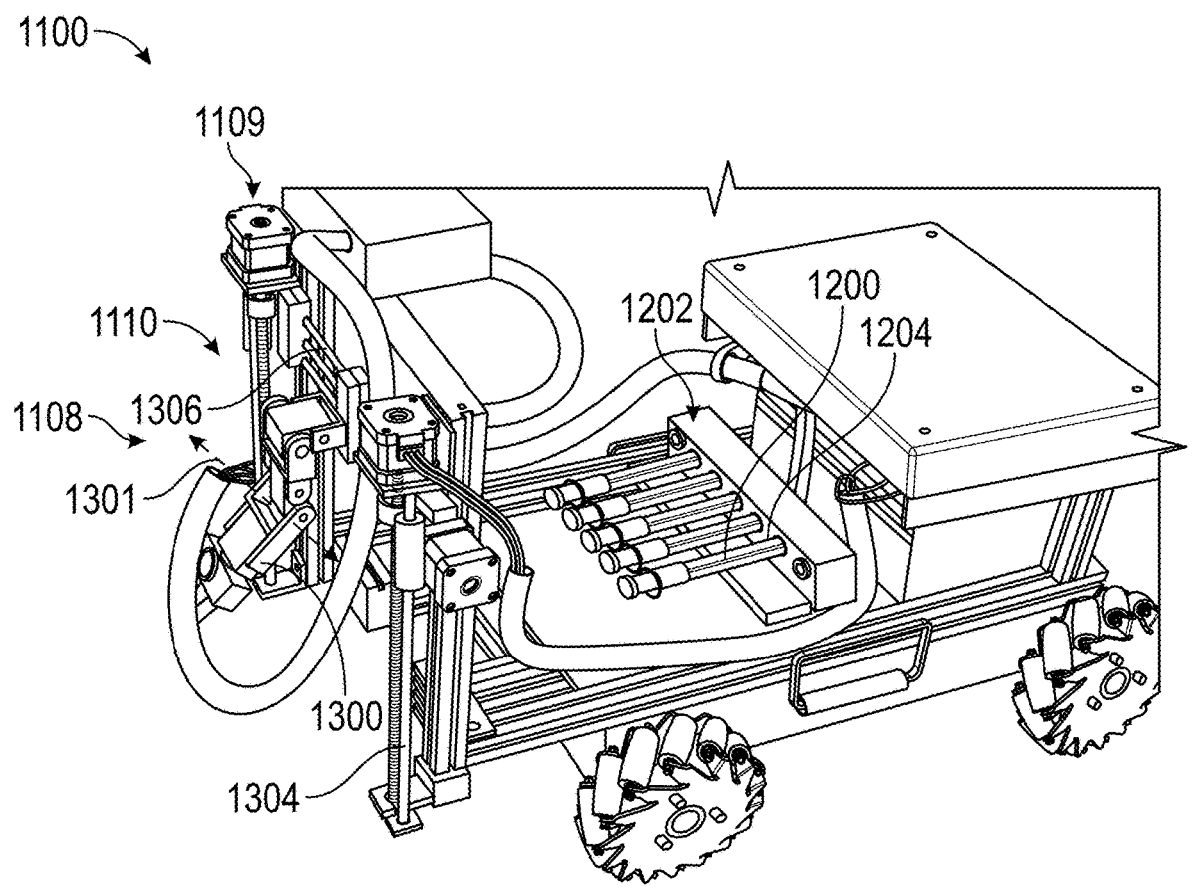
FIG. 13 shows another perspective view of the mobile robot of FIG. 11, consistent with embodiments of the present disclosure.
Figure 14:
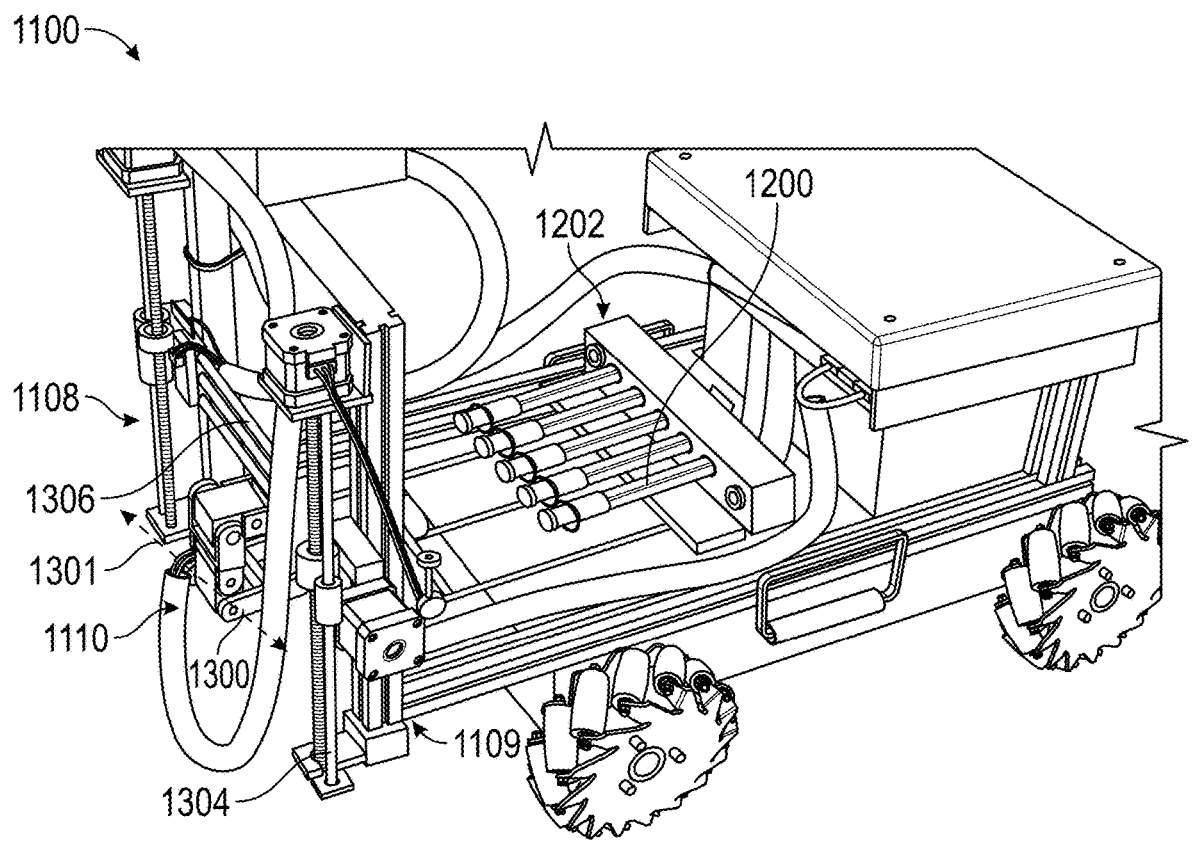
FIG. 14 shows another perspective view of the mobile robot of FIG. 11, consistent with embodiments of the present disclosure.

FIG. 13 shows the sample collector 1108 transitioning from a collector stowed position towards a collector retrieval position. FIG. 14 shows the sample collector 1108 in the collector retrieval position. The swab applicator 1110 includes a pivoting arm 1300 that pivots about one or more pivot axes 1301 in response to the sample collector 1108 transitioning between the applicator stowed position and the applicator retrieval position.

As shown, when sample collector 1108 transitions between the collector stowed position the collector retrieval position, a position of the swab applicator 1110 is adjusted by the positioning system 1109. The positioning system 1109 may adjust a vertical and/or horizontal position of the swab applicator 1110 such that the swab applicator 1110 can couple to a respective swab 1200 stored within the swab holder 1202.

For example, the positioning system 1109 can be configured to align the pivoting arm 1300 with a respective swab 1200 disposed within the swab holder 1202. In this example, and as shown, the positioning system 1109 is configured to cause the pivoting arm 1300 to move in a generally vertical direction (e.g., by moving the positioning system 1109 along positioning system vertical guides 1304) and a generally horizontal direction (e.g., by moving the positioning system 1109 along positioning system horizontal guides 1306). The positioning system 1109 may be configured to align the pivoting arm 1300 by, for example, positioning the pivoting arm 1300 in a predetermined aligned location. Additionally, or alternatively, the positioning system 1109 may include one or more sensors (e.g., optical sensors, such as a camera) configured to provide feedback relating to the alignment of the pivoting arm 1300 with the swab holder 1202. Use of one or more sensors to align the pivoting arm 1300 may mitigate a risk of the swab 1200 contacting a respective swab receptacle 1204 during removal and/or insertion.

Figure 15:
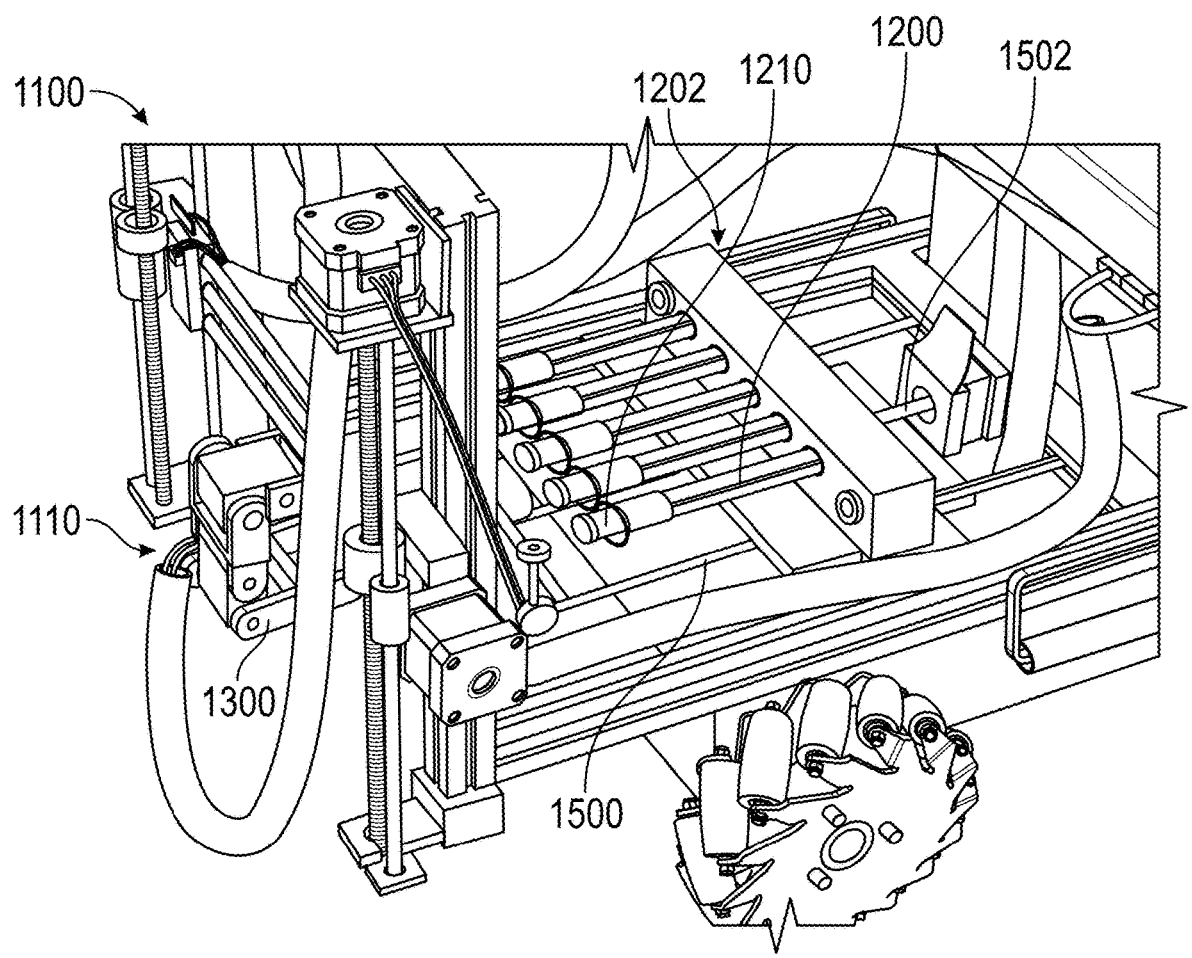
FIG. 15 shows another perspective view of the mobile robot of FIG. 11, consistent with embodiments of the present disclosure.

FIG. 15 shows the swab holder 1202 transitioning from a holder stowed position towards a holder retrieval position. As shown, the swab holder 1202 moves along holder guides 1500 in response to rotation of a screw 1502 when transitioning between the holder stowed and retrieval positions. When transitioning towards the holder retrieval position, a separation distance between the swab applicator 1110 and the swab holder 1202 decreases. When in the holder retrieval position, the swab applicator 1110 is configured to couple to the stopper 1210 of a respective swab 1200. For example, as shown in FIG. 15A, the pivoting arm 1300 may include a coupler 1550 configured to releasably couple to the stopper 1210.

As shown in FIG. 15A, the pivoting arm 1300 includes at least one linear actuator 1552, wherein a first end 1554 of the linear actuator 1552 defines one of the one or more pivot axes 1301 and a second end 1556 of the linear actuator 1552 is coupled to a collar 1558. The collar 1558 is configured to slidably engage the coupler 1550. As shown, the collar 1558 is configured to slide linearly between a coupler first end 1560 and a coupler second end 1562. Movement of the collar 1558 from the coupler first end 1560 towards the coupler second end 1562 causes a size (e.g., a diameter) of a receiving orifice 1564 of the coupler 1550 to decrease. Movement of the collar 1558 from the coupler second end 1562 towards the coupler first end 1562 causes the size of the receiving orifice 1564 to increase. When coupling to the stopper 1210, the stopper 1210 is positioned within the receiving orifice 1564 and the collar 1558 is moved towards the coupler second 1562 such that an inner surface of the coupler 1550 engages the stopper 1210. When releasing the stopper 1210, the collar 1558 is moved towards the coupler first end 1560 (e.g., such that the coupler 1550 comes out of engagement with the stopper 1210).

As also shown in FIG. 15A, a motor 1566 may be configured to cause the coupler 1550 to rotate within the collar 1558. Rotation of the coupler 1550 within the collar 1558 may enable the coupler 1550 to cooperate with threaded stoppers 1210 (e.g., by enabling the coupler to threadably couple and decouple the stopper 1210 from a respective swab receptacle 1204). Additionally, or alternatively, rotation of the coupler 1550 may cause an adhesive coupling between the stopper 1210 and a respective swab receptacle 1204 to be broken. Rotation of the coupler 1550 may also be used to rotate the swab 1200 when the swab 1200 is engagement with the floor 1102.

Figure 16:
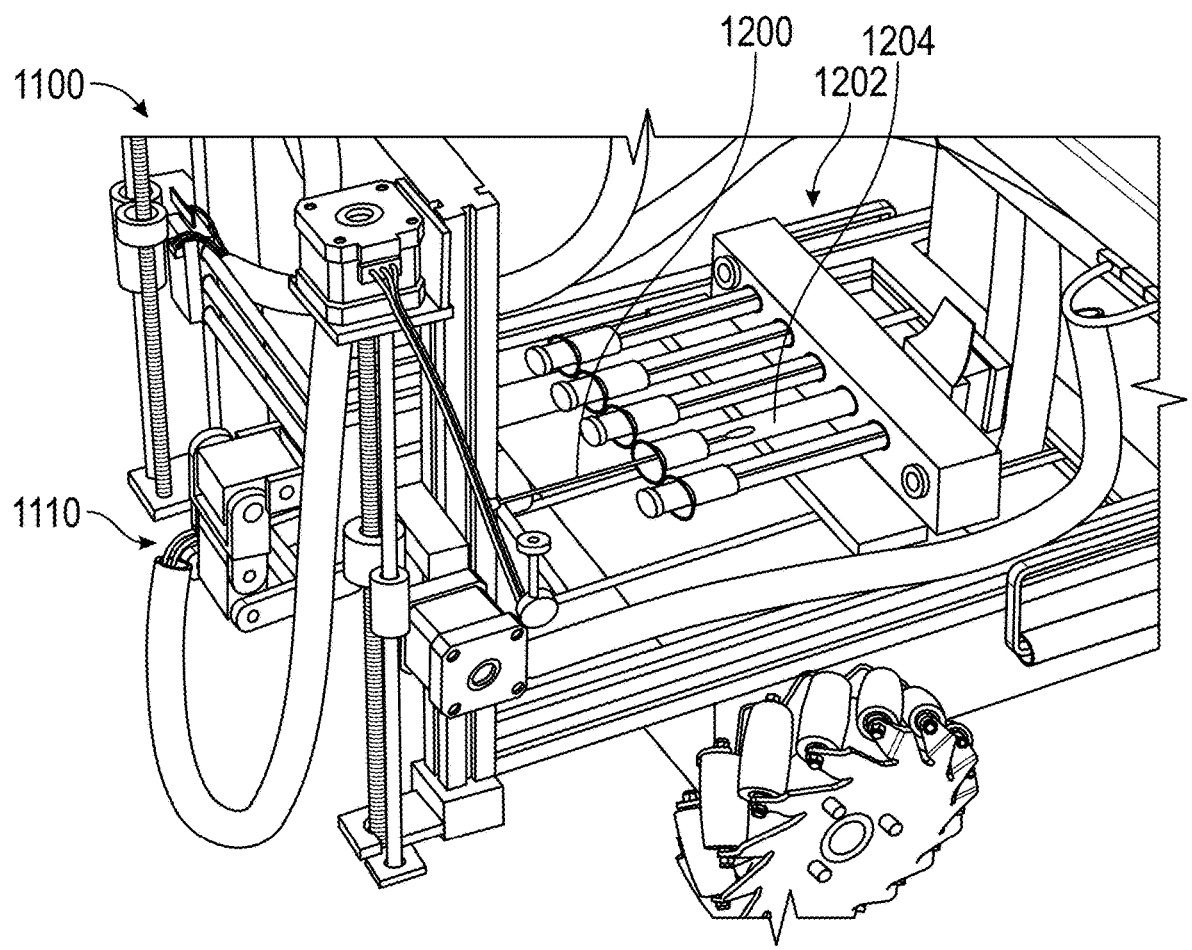
FIG. 16 shows another perspective view of the mobile robot of FIG. 11, consistent with embodiments of the present disclosure.

As shown in FIG. 16, when the swab holder 1202 transitions from the holder retrieval position back towards the holder stowed position, the separation distance between the swab applicator 1110 and the swab holder 1202 increases. As a result, the swab 1200 is removed from the swab receptacle 1204 when the swab holder 1202 reaches the holder stowed position.

Figure 17:
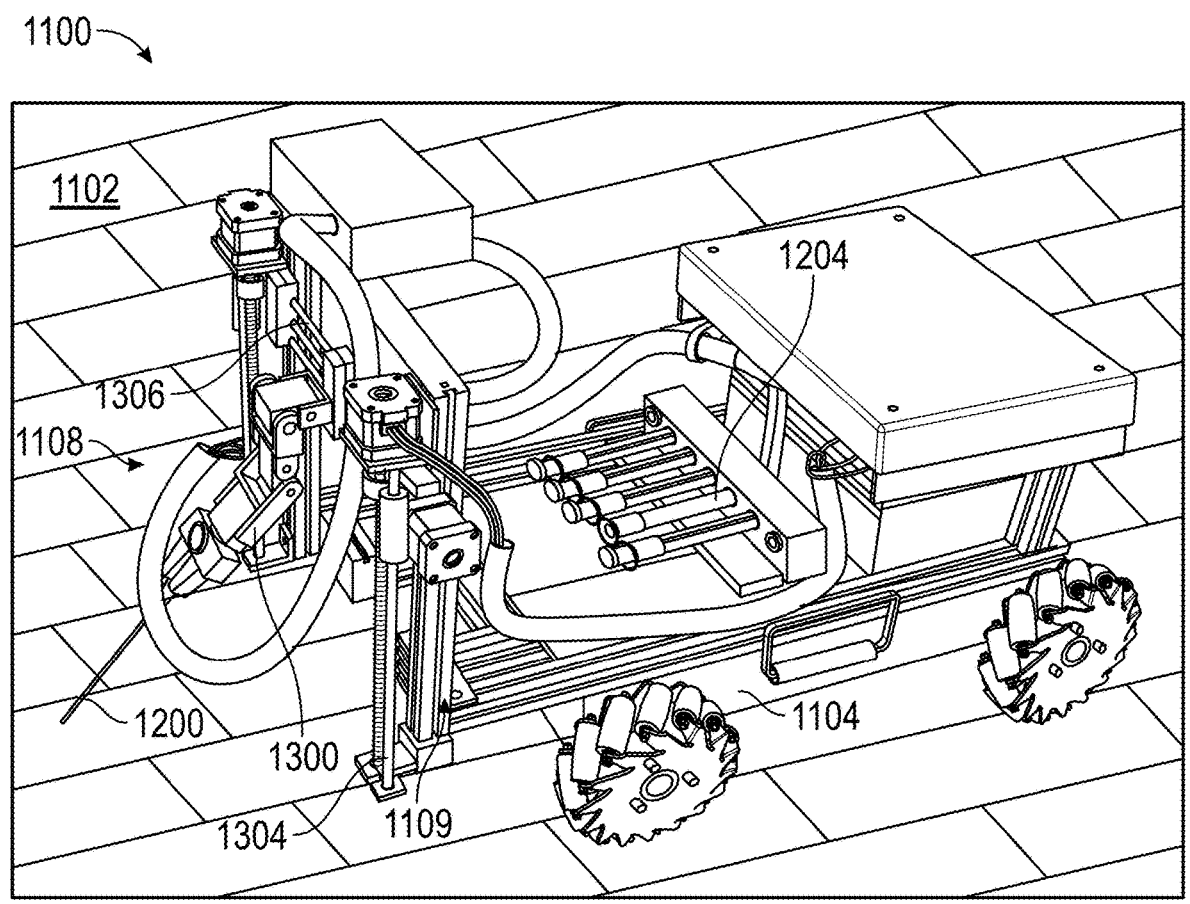
FIG. 17 shows another perspective view of the mobile robot of FIG. 11, consistent with embodiments of the present disclosure.

As shown in FIG. 17, when the swab 1200 is removed from the swab receptacle 1204, the sample collector 1108 transitions from the collector retrieval position towards a collector use position. When the sample collector 1108 transitions to the collector use position, the pivoting arm 1300 may pivot such that the swab 1200 extends in a direction of the floor 1102 and in a direction away from the chassis 1104 and the positioning system 1109 may urge the swab applicator 1110 along vertical and/or horizontal guides 1304 and 1306 until the swab 1200 engages the floor 1102.

Figure 18:
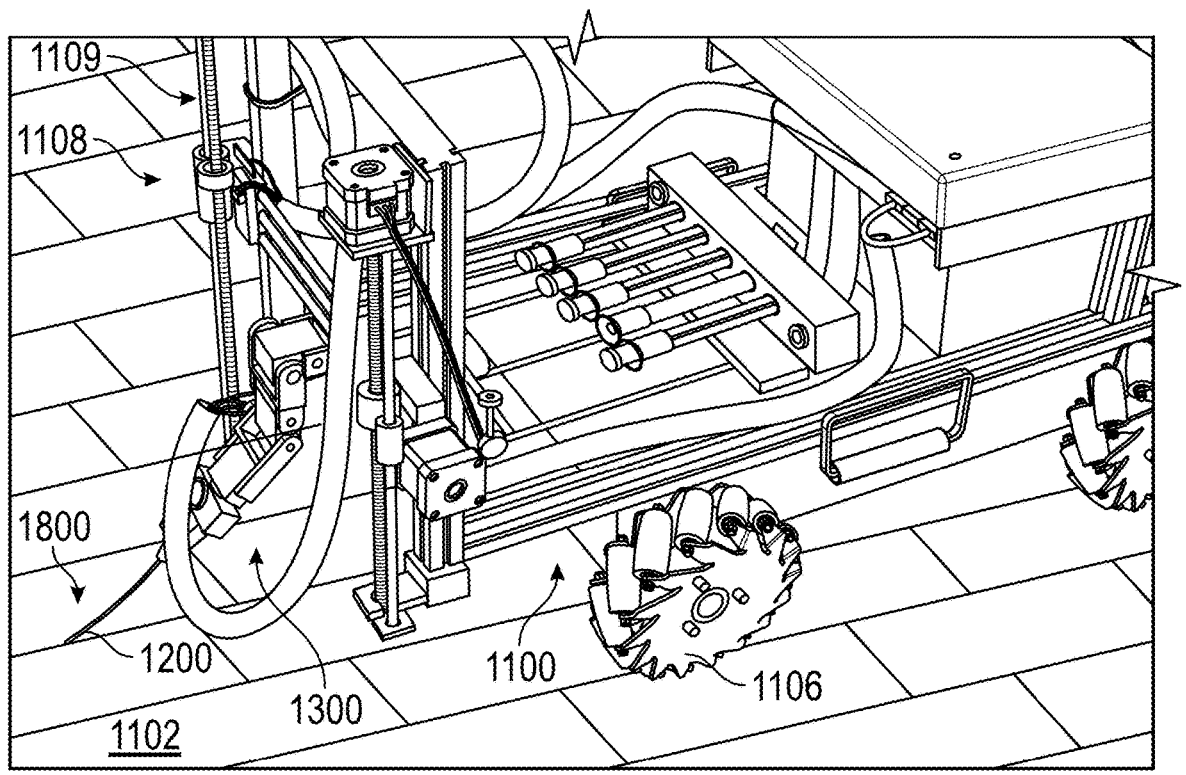
FIG. 18 shows another perspective view of the mobile robot of FIG. 11, consistent with embodiments of the present disclosure.

As shown in FIG. 18, when the sample collector 1108 is in the collector use position, a collection end 1800 of the swab 1200 engages the floor 1102. While the collection end 1800 of the swab 1200 engages the floor 1102, the mobile robot 1100 may be caused to move about the floor according to a predetermined pattern. The predetermined pattern may be, for example, a rectangular (e.g., square) pattern, a spiral pattern, a circular pattern, and/or any other pattern. For example, the mobile robot 1100 may configured to first move backward then leftward then forward then rightward then backward (e.g., at a reduced, such as half, speed) then leftward and then forward (e.g., at a reduced, such as half, speed). In this example, before changing motional direction, the swab 1200 may be rotated about a longitudinal axis of the swab 1200 such that a different portion of the swab 1200 engages the floor 1102. Changes in speed may be carried out based on rotational data received from a gyroscope. The mobile robot 1100 may move in each direction for a predetermined period of time (e.g., 1 second, 2 seconds, 3 seconds, 4 seconds, 5 seconds, 6 seconds, 7 seconds, 8 seconds, 9 seconds, 10 seconds, and/or any other predetermined period of time).

In addition to, or in the alternative to, causing the mobile robot 1100 to move according to a predetermined pattern in order to move swab 1200 along the floor 1102, the positioning system 1109 and/or the pivoting arm 1300 (e.g., the linear actuator 1552 of the pivoting arm 1300) may be configured to move the swab 1200 in a predetermined pattern. Such a configuration may allow the swab 1200 move within a smaller area on the floor 1102.

In some instances, the omnidirectional wheels 1106 may include and/or be coupled to shock absorbers. The shock absorbers may be configured to mitigate vertical movement of the mobile robot 1100 in response to the omnidirectional wheels 1106 encountering, for example, traversable discontinuities in the floor 1102. Such a configuration may encourage consistent engagement between the swab 1200 and the floor 1102.

Figure 19:
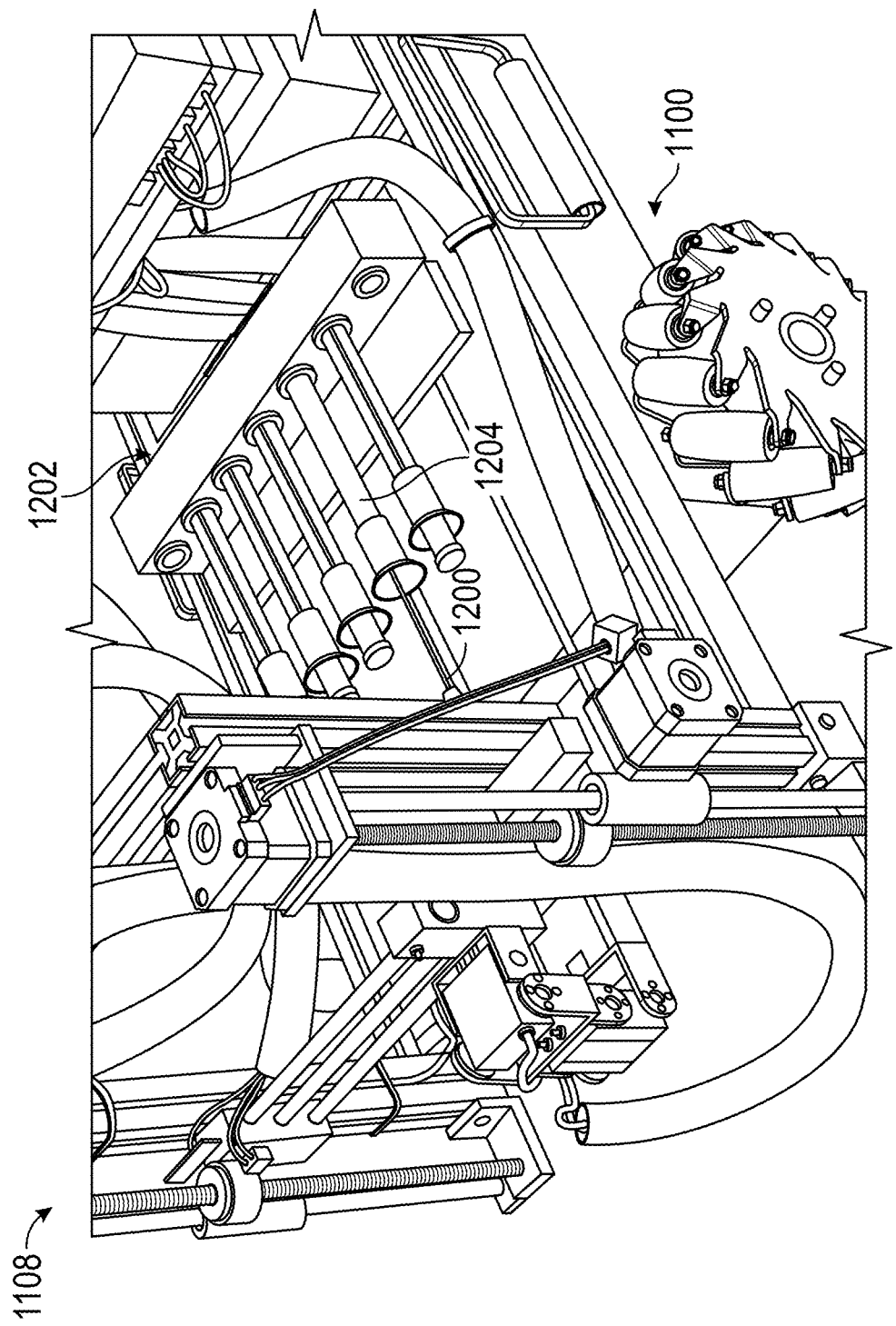
FIG. 19 shows another perspective view of the mobile robot of FIG. 11, consistent with embodiments of the present disclosure.

With reference to FIG. 19, after a sample has been collected, the sample collector 1108 transitions back to the collector retrieval position. In response to the sample collector 1108 returning to the collector retrieval position, the swab holder 1202 is caused to transition from the holder stowed position towards the holder retrieval position. As the swab holder 1202 approaches the holder retrieval position, the swab 1200 is inserted back into the swab receptacle 1204 from which the swab 1200 was originally retrieved.

Figure 20:
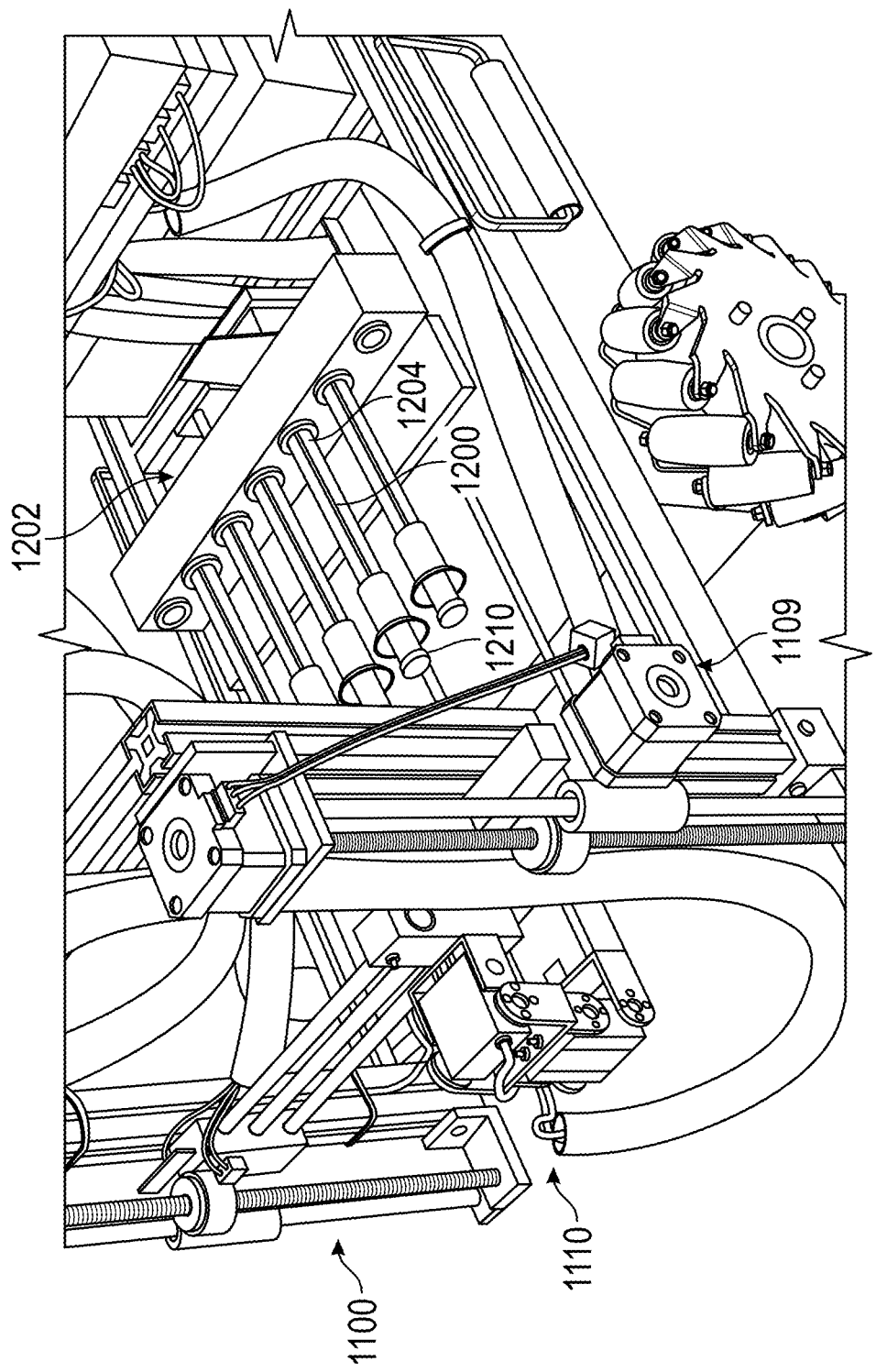
FIG. 20 shows another perspective view of the mobile robot of FIG. 11, consistent with embodiments of the present disclosure.

As shown in FIG. 20, when the swab 1200 is fully inserted into the swab receptacle 1204, the stopper 1210 sealingly engages the open end 1208 of the swab receptacle 1204 and the swab applicator 1110 releases the stopper 1210. When the swab applicator 1110 releases the stopper 1210, the swab holder 1202 transitions back to the holder stowed position. In some instances, prior to the swab holder 1202 transitioning back to the holder stowed position, the positioning system 1109 may move the swab applicator 1110 such that swab applicator 1110 is positioned to couple to another stopper 1210 corresponding to another swab 1200 that is disposed within another swab receptacle 1204. In these instances, the mobile robot 1100 may proceed to collect another sample after the swab holder 1202 returns to the holder stowed position. As such, the mobile robot 1100 can be configured to track the number of swabs 1200 used relative to the number of swab holder receptacles 1204. When the number of swabs 1200 equals the number of swab holder receptacles 1204, the mobile robot 1100 generate an alert to a user and/or obtain new swabs 1200 and/or swab receptacles 1204.

Figure 21:
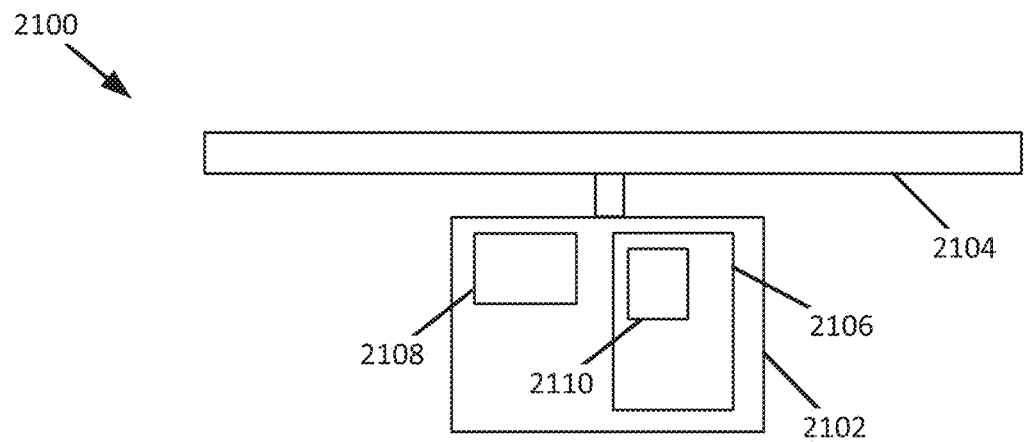
FIG. 21 shows a schematic example of a mobile robot configured to fly, consistent with embodiments of the present disclosure.

FIG. 21 shows a schematic example of a mobile robot 2100 configured to fly within an environment, which may allow the mobile robot 2100 to traverse an environment more quickly and/or traverse additional regions within the environment when compared to a ground based mobile robot. As shown, the mobile robot 2100 includes a body 2102 and at least one rotor 2104 configured to generate lift. The lift generated in response to a rotation of the at least one rotor 2104 is sufficient to cause the mobile robot 2100 to become airborne.

The body 2102 of the mobile robot 2100 may include a sample collection system 2106. The sample collection system 2106 is configured such that air passes into the sample collection system 2106 while the mobile robot 2100 is traversing the environment. As air passes into the sample collection system 2106, the air is incident on (e.g., passes through) one or more collection mediums 2108 of the sample collection system 2106. The one or more collection mediums 2108 are configured to collect one or more pathogens that are suspended within the air. One example of a collection medium 2108 includes an air filter having a pore size and/or properties (e.g., electrostatic properties) that encourage collection of one or more pathogens. In this example, the pore size and/or filter properties may be adjusted to target specific pathogens. Another example of a collection medium 2108 may be a liquid buffer collection medium configured to collect pathogens through condensation. In this example, condensation of aerosolized pathogens into liquid may reduce a number of steps between collection and extraction of DNA and/or RNA when compared to collection of pathogens in a solid material.

As shown, in some instances, the sample collection system 2106 may include an analysis system 2110 configured to analyze at least one of the one or more collection mediums 2108 in order to determine whether a pathogen has been captured by the one or more collection mediums 2108. The analysis system 2110 can be configured to extract one or more of DNA and/or RNA from collected pathogens such that the collected pathogens can be identified. Extraction of the DNA and/or RNA may be performed by a non-centrifugation system.

Figure 21A:
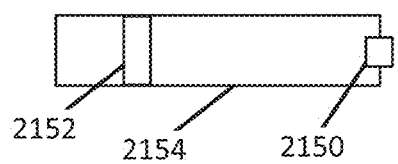
FIG. 21A shows a schematic example of an analysis system, consistent with embodiments of the present disclosure.

A first example of the analysis system 2110 may be a system that is configured to urge a liquid solution containing the collected sample through a filter membrane to clean the collected sample. The filter membrane is configured to bind with the nucleic acid and allows non-desired cellular components to flow through and be discarded. For example, with reference to FIG. 21A, the liquid solution can be urged through a filter membrane 2150 by urging a piston 2152 along a barrel 2154. In this example, the liquid solution may be disposed within the barrel 2154 such that urging the piston 2152 along the barrel 2154 urges the liquid solution through the filter membrane 2150.

A second example of the analysis system 2110 may be system configured to use sonication and/or heating to break open the cells of collected pathogens thereby releasing the DNA and/or RNA within the cells. Use of sonication and/or heating may allow the DNA and/or RNA to be extracted without the use of chemicals and/or enzymes.

A third example of the analysis system 2110 may include sheering the membranes of the pathogens (e.g., using a needle edge). Sheering the membranes releases the DNA and/or RNA for further purification.

Once the analysis system 2110 extracts the RNA and/or DNA, the analysis system 2110 may analyze the RNA and/or DNA to determine the pathogen(s) collected by the collection medium 2108. The results of the determination may be transmitted to a remote device (e.g., a remote computer) for review by an operator. As such, inclusion of the analysis system 2110 with the mobile robot 2100 may improve the speed at which pathogens are detected (when compared to analyzing collected pathogens on an analysis system that is separate from the mobile robot 2100).

In some instances, a plurality of mobile robots 2100 may be deployed within an environment. In these instances, multiple samples may be collected at different locations and/or heights. Such a configuration may allow for multiple locations to be monitored simultaneously. In some instances, the plurality of mobile robots 2100 may be configured to communicate with each other.

Figure 22:
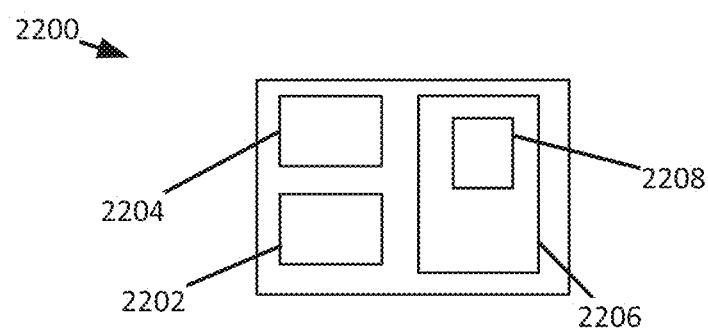
FIG. 22 shows a schematic example of a docking station configured to cooperate with the mobile robot of FIG. 21, consistent with embodiments of the present disclosure.

FIG. 22 shows a schematic example of a docking station 2200 configured to cooperate with the mobile robot 2100. The docking station 2200 may be configured to include similar features as those discussed in relation to the docking station 104 of FIG. 1. The docking station 2200 may include a supply replenisher 2202 and/or one or more charging contacts 2204 to recharge one or more batteries of the mobile robot 2100. The supply replenisher 2202 may configured to replace and/or replenish the one or more collection mediums 2108. In some instances, the docking station 2200 may include a sample receiver 2206 configured to remove the collected samples (e.g., the one or more collection mediums 2108 from the mobile robot 2100). The sample receiver 2206 may include an analysis system 2208 configured to analyze at least one of the one or more collection mediums 2108 in order to determine whether a pathogen has been captured by the one or more collection mediums 2108.

The analysis system 2208 may function similarly to the analysis system 2110 of FIG. 21. As such, when the docking station 2200 includes the analysis system 2208 the mobile robot 2100 may not include the analysis system 2110. This may reduce weight and/or reduce energy consumption of the mobile robot 2100.

An example of a mobile robot, consistent with the present disclosure, may include one or more driven wheels, one or more sensors, and a sample collector. The sample collector may include a collection medium holder, a plurality of collection mediums disposed within the collection medium holder, and a collection medium applicator configured to releasably couple to a respective collection medium disposed within the collection medium holder.

In some instances, the plurality of collection mediums may include a plurality of swabs. In some instances, the collection medium holder may include a cartridge having a cartridge body that defines a cartridge cavity, the cartridge cavity including a plurality of collection medium receptacles configured to receive a respective collection medium. In some instances, the cartridge may be configured to be rotated. In some instances, the collection medium applicator may be configured to urge the respective collection medium into engagement with a surface. In some instances, the collection medium applicator may be configured to agitate the respective collection medium along the surface. In some instances, the one or more sensors may include a surface type sensor configured to detect a surface type and the collection medium applicator agitates the respective collection medium based, at least in part, on the detected surface type. In some instances, the collection medium applicator may further include one or more contact sensors configured to detect engagement of the respective collection medium with the surface. In some instances, the collection medium applicator may be configured to rotate the respective collection medium about an actuation axis. In some instances, the collection medium applicator may be configured to urge the respective collection medium along an actuation axis.

An example of a bio-surveillance system, consistent with the present disclosure, may include a mobile robot and a docking station. The mobile robot may include one or more driven wheels, one or more sensors, and a sample collector. The sample collector may include a collection medium holder, a plurality of collection mediums disposed within the collection medium holder, and a collection medium applicator configured to releasably couple to a respective collection medium disposed within the collection medium holder. The docking station may be configured to receive one or more collected environmental samples.

In some instances, the plurality of collection mediums may include a plurality of swabs. In some instances, the collection medium holder may include a cartridge having a cartridge body that defines a cartridge cavity, the cartridge cavity including a plurality of collection medium receptacles configured to receive a respective collection medium. In some instances, the cartridge may be configured to be rotated. In some instances, the collection medium applicator may be configured to urge the respective collection medium into engagement with a surface. In some instances, the collection medium applicator may be configured to agitate the respective collection medium along the surface. In some instances, the one or more sensors may include a surface type sensor configured to detect a surface type and the collection medium applicator agitates the respective collection medium based, at least in part, on the detected surface type. In some instances, the collection medium applicator may further include one or more contact sensors configured to detect engagement of the respective collection medium with the surface.

Another example of a robot, consistent with the present disclosure, may include a sample collector. The sample collector may include a collection medium holder, a plurality of collection mediums disposed within the collection medium holder, and a collection medium applicator configured to releasably couple to a respective collection medium disposed within the collection medium holder.

In some instances, the collection medium holder may include a cartridge having a cartridge body that defines a cartridge cavity, the cartridge cavity including a plurality of collection medium receptacles configured to receive a respective collection medium.

While the present disclosure generally discloses detection of pathogens, the disclosed robot, docking station, and system for bio-surveillance may also be used to detect non-pathogenic microorganisms. Detection of non-pathogenic (and/or pathogenic) microorganisms may allow changes in a microbial community (e.g., resulting from climate change) to be monitored. Additionally, or alternatively, the disclosed robot, docking station, and system for bio-surveillance may be configured to detect substances (e.g., chemical substances) harmful to humans and/or animals.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. The terms "connected" or "coupled" as used herein is a relative term and does not require a direct physical connection, unless otherwise stated.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising," "including," and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A mobile robot comprising:
   one or more driven wheels;
   one or more sensors configured to generate mapping data; and
   a sample collector including:
     a sample storage having a first sample receptacle and a second sample receptacle;
     a first identifier associated with the first sample receptacle;
     a second identifier associated with the second sample receptacle;
     a first collection medium and a second collection medium; and
     a collection medium applicator configured to:
       releasably couple to the first collection medium;
       contact the first collection medium with a location on a surface, wherein the location on the surface is determined using the mapping data and is associated with the first identifier; and
       deposit the first collection medium in the first sample receptacle.

2. The mobile robot of claim 1, wherein the first and second collection mediums each include a swab.

3. The mobile robot of claim 1, wherein the sample collector further includes a collection medium holder that includes a cartridge having a cartridge body that defines a cartridge cavity, the cartridge cavity including a plurality of collection medium receptacles configured to receive a respective collection medium.

4. The mobile robot of claim 3, wherein the cartridge is configured to be rotated.

5. The mobile robot of claim 1, wherein the collection medium applicator is configured to agitate the first collection medium along the surface.

6. The mobile robot of claim 5, wherein the one or more sensors include a surface type sensor configured to detect a surface type and the collection medium applicator agitates the first collection medium based, at least in part, on the detected surface type.

7. The mobile robot of claim 1, wherein the collection medium applicator further includes one or more contact sensors configured to detect engagement of the first collection medium with the surface.

8. The mobile robot of claim 1, wherein the collection medium applicator is configured to rotate the first collection medium about an actuation axis.

9. The mobile robot of claim 1, wherein the collection medium applicator is configured to move the first collection medium along an actuation axis.

10. A bio-surveillance system comprising:
    a mobile robot, the mobile robot including:
      one or more driven wheels;
      one or more sensors configured to generate mapping data; and
      a sample collector including:
        a collection medium holder;
        a sample storage having a first sample receptacle and a second sample receptacle;
        a first identifier associated with the first sample receptacle;
        a second identifier associated with the second sample receptacle;
        a first collection medium and a second plurality of collection medium disposed in the collection medium holder; and
        a collection medium applicator configured to:
          releasably couple to the first collection medium;
          remove the first collection medium from the collection medium holder;
          contact the first collection medium with a location on a surface, wherein the location on the surface is determined using the mapping data and is associated with the first identifier; and deposit the first collection medium in the first sample receptacle; and a docking station, the docking station configured to receive the first and second collection mediums.

11. The bio-surveillance system of claim 10, wherein each of the first and the second collection mediums include a swab.

12. The bio-surveillance system of claim 10, wherein the collection medium holder includes a cartridge having a cartridge body that defines a cartridge cavity, the cartridge cavity including a plurality of collection medium receptacles configured to receive a respective collection medium.

13. The bio-surveillance system of claim 12, wherein the cartridge is configured to be rotated.

14. The bio-surveillance system of claim 10, wherein the collection medium applicator is configured to agitate the first collection medium along the surface.

15. The bio-surveillance system of claim 14, wherein the one or more sensors include a surface type sensor configured to detect a surface type and the collection medium applicator agitates the first collection medium based, at least in part, on the detected surface type.

16. The bio-surveillance system of claim 10, wherein the collection medium applicator further includes one or more contact sensors configured to detect engagement of the first collection medium with the surface.

17. The bio-surveillance system of claim 10, wherein the collection medium holder includes the sample storage.

18. A robot comprising:
one or more sensors configured to generate mapping data; and
a sample collector including:
a collection medium holder;
a sample storage having a first sample receptacle and a second sample receptacle;
a first identifier associated with the first sample receptacle;
a second identifier associated with the second sample receptacle;
a first collection medium and a second plurality of collection medium disposed in the collection medium holder; and
a collection medium applicator configured to:
releasably couple to the first collection medium;
remove the first collection medium from the collection medium holder;
contact the first collection medium with a location on a surface, wherein the location on the surface is determined using the mapping data and is associated with the first identifier; and
deposit the first collection medium in the first sample receptacle. disposed within the collection medium holder.

19. The robot of claim 18, wherein the collection medium holder includes a cartridge having a cartridge body that defines a cartridge cavity, the cartridge cavity including a plurality of collection medium receptacles configured to receive a respective collection medium.

20. The robot of claim 18, wherein the collection medium holder includes the sample storage.

* * * * *